(12) United States Patent
Morimura et al.

(10) Patent No.: US 6,556,935 B2
(45) Date of Patent: Apr. 29, 2003

(54) SMALL SHAPE RECOGNIZING CAPACITIVE SENSOR DEVICE

(75) Inventors: Hiroki Morimura, Kanagawa (JP);
Satoshi Shigematsu, Kanagawa (JP);
Katsuyuki Machida, Kanagawa (JP);
Hakaru Kyuragi, Tokyo (JP);
Toshishige Shimamura, Kanagawa (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 09/877,829

(22) Filed: Jun. 8, 2001

(65) Prior Publication Data

US 2002/0017136 A1 Feb. 14, 2002

(30) Foreign Application Priority Data

| Jun. 8, 2000 | (JP) | ........................ | 2000/171929 |
| Jun. 8, 2000 | (JP) | ........................ | 2000/171932 |
| Jun. 8, 2000 | (JP) | ........................ | 2000/171935 |

(51) Int. Cl.[7] ............................................. G01F 25/00
(52) U.S. Cl. ........................ 702/104; 702/130; 702/100
(58) Field of Search .......................... 702/104, 94, 100, 702/130; 382/124, 4; 271/265; 257/431; 73/1.38; 700/281; 356/351; 250/343, 345

(56) References Cited

U.S. PATENT DOCUMENTS

| 5,325,442 A | * | 6/1994 | Knapp ........................... 382/4 |
| 5,577,720 A | * | 11/1996 | Laskowski ............. 271/265.04 |
| 6,259,804 B1 | * | 7/2001 | Setlak et al. .................. 382/124 |

FOREIGN PATENT DOCUMENTS

| JP | 59067667 | 4/1984 |
| JP | 4-502065 | 9/1990 |
| JP | 11-69231 | 8/1997 |
| JP | 2000-279397 | 3/1998 |
| JP | 2000-08908 | 7/1998 |
| JP | 2001-523349 | 3/1999 |
| JP | 2000-028311 | 1/2000 |

* cited by examiner

*Primary Examiner*—John Barlow
*Assistant Examiner*—Tung Lau
(74) *Attorney, Agent, or Firm*—Blakely Sokoloff Taylor & Zafman

(57) ABSTRACT

A small shape recognizing capacitive sensor device includes detection elements, sensor circuits, and a correction circuit. The detection elements are arranged adjacent to each other. The sensor circuits are connected to the detection elements, respectively. The correction circuit corrects the output signal level of the sensor circuit. The output signal level correction circuit includes a calibration circuit, calibration reference signal generation circuit, and comparison circuit. The calibration circuit is connected to the output side of the sensor circuit. The calibration reference signal generation circuit generates a calibration reference signal. The comparison circuit compares the output from the sensor circuit with the calibration reference signal and supplies the difference output to the calibration circuit as a control signal. The calibration circuit corrects the level of the sensor circuit output on the basis of the control signal such that the difference between the output from the sensor circuit and the calibration reference signal becomes zero.

26 Claims, 27 Drawing Sheets

SMALL SHAPE RECOGNIZING
CAPACITIVE SENSOR DEVICE

BACKGROUND OF THE INVENTION

The present invention relates to a small shape recognizing capacitive sensor device and, more particularly, to a small shape recognizing capacitive sensor device for sensing a small three-dimensional pattern such as a human fingerprint or animal noseprint.

As application examples of a small shape recognizing capacitive sensor device, a number of fingerprint sensors for detecting a fingerprint pattern have been proposed (e.g., "ISSCC DIGEST OF TECHNICAL PAPERS" February 1998, pp. 284–285). With this technique, an electrostatic capacitance formed between sensor electrodes in cells (to be referred to as sensor cells hereinafter) which are two-dimensionally arrayed on an LSI chip and the skin of a finger which comes into contact with the sensor electrodes via a passivation film is detected, thereby sensing the three-dimensional pattern on the finger skin surface. Since the value of the formed capacitance changes depending on the three-dimensional pattern on the finger skin surface, the three-dimensional pattern on the finger skin surface can be sensed by detecting the capacitance difference.

FIG. 36 shows sensor cells of such a conventional small shape recognizing capacitive sensor device. Each sensor cell 11 is formed from a detection element 1 and sensor circuit 2. The detection element 1 is an element for converting the surface shape into an electrical signal. The sensor circuit 2 is a circuit for measuring the electric change amount from the detection element, which changes depending on the surface shape. An output signal 2A output from the sensor cell 11 is input to an A/D conversion circuit 4 through a data line $L_D$ and output as a digital output signal 4A. The data line $L_D$ is shared by the plurality of sensor cells 11. The sensor cells 11 are sequentially selected, and the output signals 2A from the sensor cells 11 are sequentially input to the A/D conversion circuit 4.

FIG. 37 shows the detailed structure of the conventional sensor cell. The detection element 1 is an element for converting the surface shape into an electrical signal 1A. The sensor circuit 2 is a circuit for measuring the electric change amount from the detection element 1, which changes depending on the surface shape. The detection element 1 is implemented by a sensor electrode 1B formed on an insulating layer 16 and covered with a passivation film 15 and uses, as the electrical signal, an electrostatic capacitance $C_F$ formed between a finger skin 14 and the sensor electrode 1B. The sensor circuit 2 is formed from a Pch MOSFET $Q_1$, Nch MOSFETs $Q_2$ and $Q_3$, constant current source I, and resistor R. $C_{P0}$ a is a parasitic capacitance.

FIG. 38 shows the operation timing. Before time T1, a sensor circuit control signal $PRE_0$ is controlled to a power supply voltage $V_{DD}$ to keep the MOSFET $Q_1$ off, and a sensor circuit control signal RE is controlled to a voltage of 0 V to keep the MOSFET $Q_2$ off. A node $N_1$ is at 0 V. At time T1, the signal $PRE_0$ is controlled to 0 V to turn on the MOSFET $Q_1$, and the node $N_1$ rises to $V_{DD}$. At time T2, the signals $PRE_0$ and RE are controlled to $V_{DD}$ to turn off the MOSFET $Q_1$ and turn on the MOSFET $Q_2$. Charges accumulated in the electrostatic capacitance $C_F$ are removed, and the potential of the node $N_1$ gradually drops. At time T3 later than time T2 by $\Delta t$, when the signal RE is controlled to 0 V to turn off the MOSFET $Q_2$, the potential $V_{DD}-\Delta V$ of the node $N_1$ at that time is kept and output from the MOSFET $Q_3$. With this operation, the output signal 2A having a voltage corresponding to the value of the electrostatic capacitance $C_F$ is generated. The three-dimensional pattern on the skin surface can be detected by measuring the magnitude of the voltage signal.

In such a conventional small shape recognizing capacitive sensor device, however, although the sensor cells are manufactured according to the same layout, the actual sensor circuits 2 do not have completely same detection sensitivity due to a variation in process. As a result, the detected image has noise due to a variation in sensitivity between the sensor circuits, and the image quality degrades. In addition, sensors having poor detection performance are formed by a variation between chips or a variation between wafers. This decreases the yield of sensor chips, resulting in an increase in manufacturing cost. This poses a serious problem especially for supply of inexpensive sensor chips.

Furthermore, even a sensor having satisfactory detection performance degrades its detection performance when the sensor surface changes depending on the use state. This shortens the performance guarantee period, and the module incorporating the sensor becomes unusable. In a system using sensors, the sensor components must be often exchanged. For this reason, the cost for coping with returned products or system maintenance increases, resulting in a serious problem. Hence, in the conventional small shape recognizing capacitive sensor device, the manufacturing cost or maintenance cost increases because the device has no means for individually adjusting the detection sensitivities of the plurality of sensor circuits.

SUMMARY OF THE INVENTION

It is the principal object of the present invention to provide a small shape recognizing capacitive sensor device having higher yield than the prior art.

In order to achieve the above object, according to the present invention, there is provided a small shape recognizing capacitive sensor device comprising a number of detection elements arranged adjacent to each other, a number of sensor circuits connected to the detection elements, respectively, and a correction circuit for correcting an output signal level of the sensor circuit, the output signal level correction circuit comprising a calibration circuit connected to an output side of the sensor circuit, a calibration reference signal generation circuit for generating a calibration reference signal, and a comparison circuit for comparing an output from the sensor circuit with the calibration reference signal and supplying a difference output to the calibration circuit as a control signal, wherein the calibration circuit corrects a level of a sensor circuit output on the basis of the control signal such that the difference between the output from the sensor circuit and the calibration reference signal becomes zero.

DESCRIPTION OF THE PREFERRED EMBODIMENTS

The preferred embodiments of the present invention will be described next.

(First Embodiment)

Figure 1:
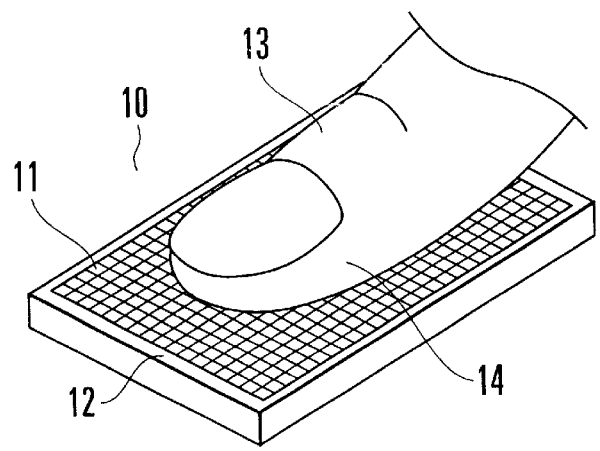
FIG. 1 is a perspective view showing the use state of a small shape recognizing capacitive sensor device according to the first embodiment of the present invention.

FIG. 1 shows the use state of a small shape recognizing capacitive sensor device according to the present invention. A small shape recognizing capacitive sensor device 10 compares and collates collation data with the small shape of an object to be recognized and collated, which has, e.g., a small three-dimensional pattern, thereby authenticating the object to the recognized.

As shown in FIG. 1, the small shape recognizing capacitive sensor device 10 is formed from a number of sensor cells arranged adjacent to each other and typically formed from a number of sensor cells 11 arranged in a two-dimensional layout (array or matrix). When an object such as a finger 13 to be recognized is brought into contact with a sensor surface 12 of the small shape recognizing capacitive sensor device 10, the surface of the object to the recognized (the three-dimensional shape of a finger skin surface 14) is individually detected by each sensor cell 11, and two-dimensional data representing the surface shape of the object to the recognized is output.

Figure 2:
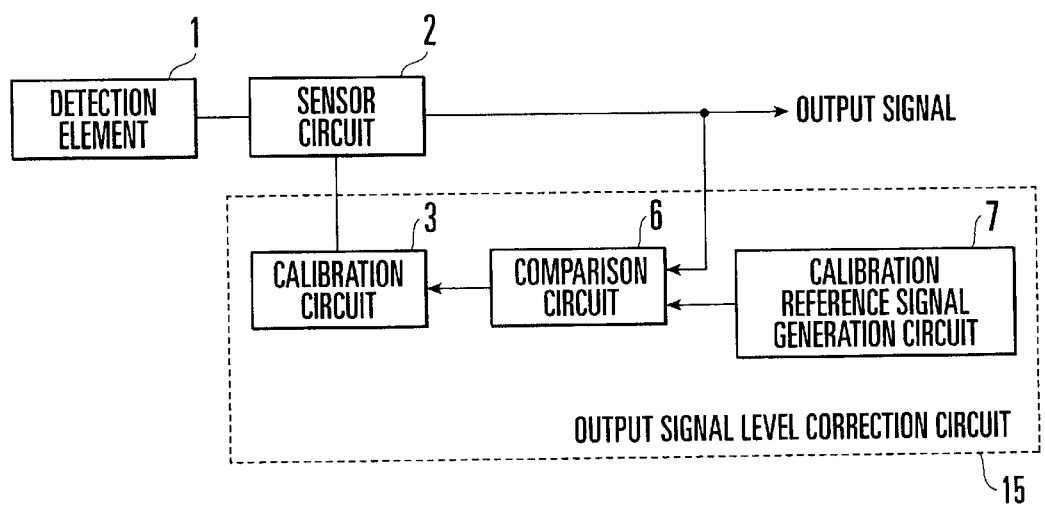
FIG. 2 is a functional block diagram showing the basic arrangement of the first embodiment.

FIG. 2 shows the basic functional arrangement of the small shape recognizing capacitive sensor device 10. The basic functional arrangement of the device 10 shown in FIG. 2 corresponds to one sensor cell 11 because a number of sensor cells have identical structures.

As shown in FIG. 2, the sensor cell 11 is formed from a detection element 1, sensor circuit 2, and output signal level correction circuit 15. The level correction circuit 15 receives the output from the sensor circuit 2 and supplies the output from the sensor circuit 2 to one input terminal of a comparison circuit 6. The comparison circuit 6 compares the output from the sensor circuit 2 with a calibration reference value (signal) as the output from a calibration reference signal generation circuit 7 so the output level of the sensor circuit 2 is adjusted by controlling the input side of the sensor circuit 2 or the gain of the sensor circuit 2 such that the output from the sensor circuit 2 equals the calibration reference signal.

The calibration reference signal generation circuit 7 is preferably designed to generate calibration reference signals of the same level for all the sensor cells.

The output signal level correction circuit 15 acts to eliminate the variation in output between the sensor cells 11 as much as possible. Any one of various known arrangements can be used as far as it performs the above operation. Details will be sequentially described in the following embodiments.

With this arrangement, the outputs from the sensor circuits, i.e., the output levels of the memory cells 11 can be adjusted to the same level, and the yield of the sensor devices can be increased as compared to the prior art.

(Second Embodiment)

Figure 3:
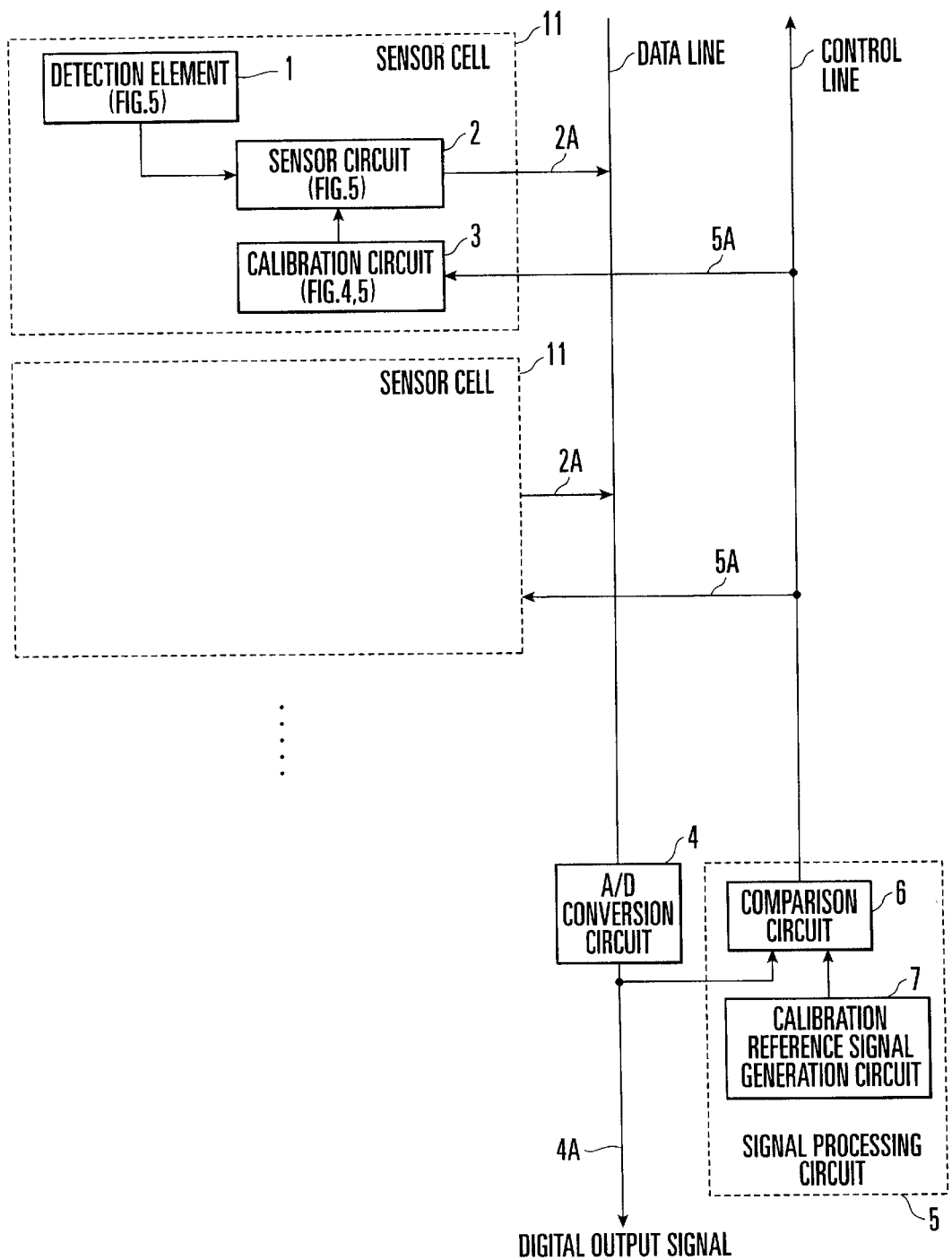
FIG. 3 is a functional block diagram showing a small shape recognizing capacitive sensor device according to the second embodiment of the present invention.

FIG. 3 shows the second embodiment of the present invention. A small shape recognizing capacitive sensor device 10 is formed from a number of sensor cells 11 arranged in a two-dimensional layout (array or matrix).

When an object such as a finger 13 to be recognized is brought into contact with a sensor surface 12 of the small shape recognizing capacitive sensor device 10, the surface of the object to the recognized (the three-dimensional shape of a finger skin surface 14) is individually detected by each sensor cell 11, and two-dimensional data representing the surface shape of the object to the recognized is output.

Figure 36:
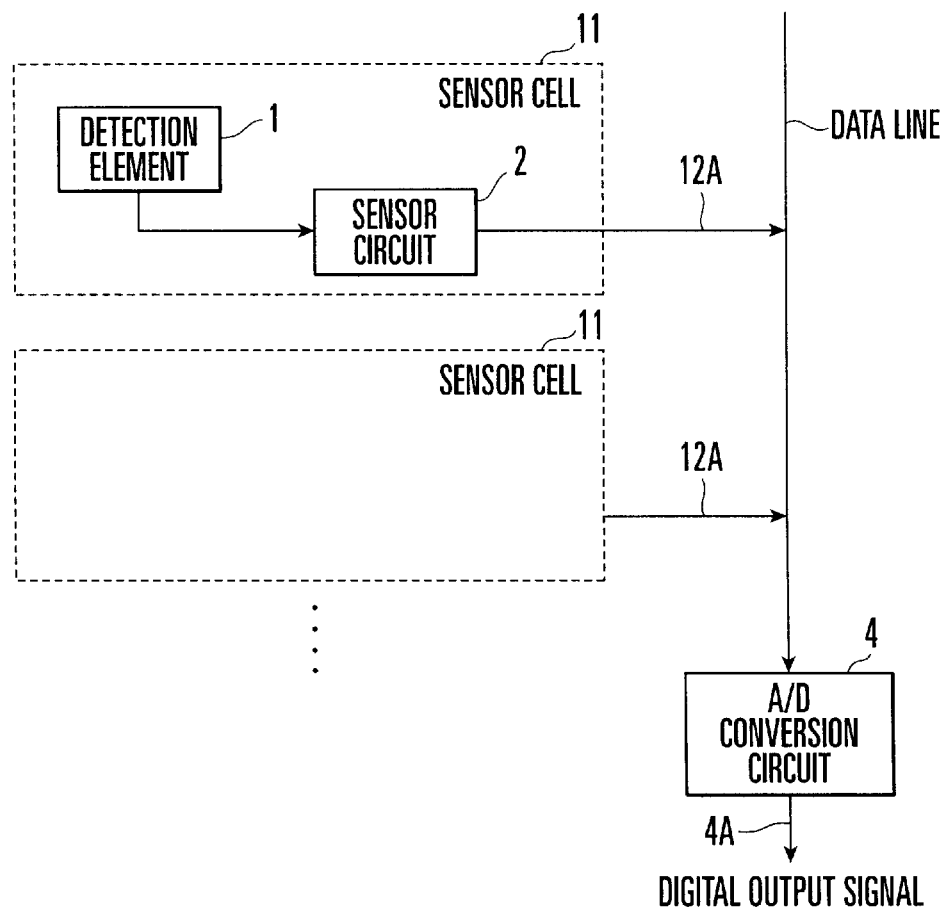
FIG. 36 is a functional block diagram of a conventional small shape recognizing capacitive sensor device.
Figure 37:
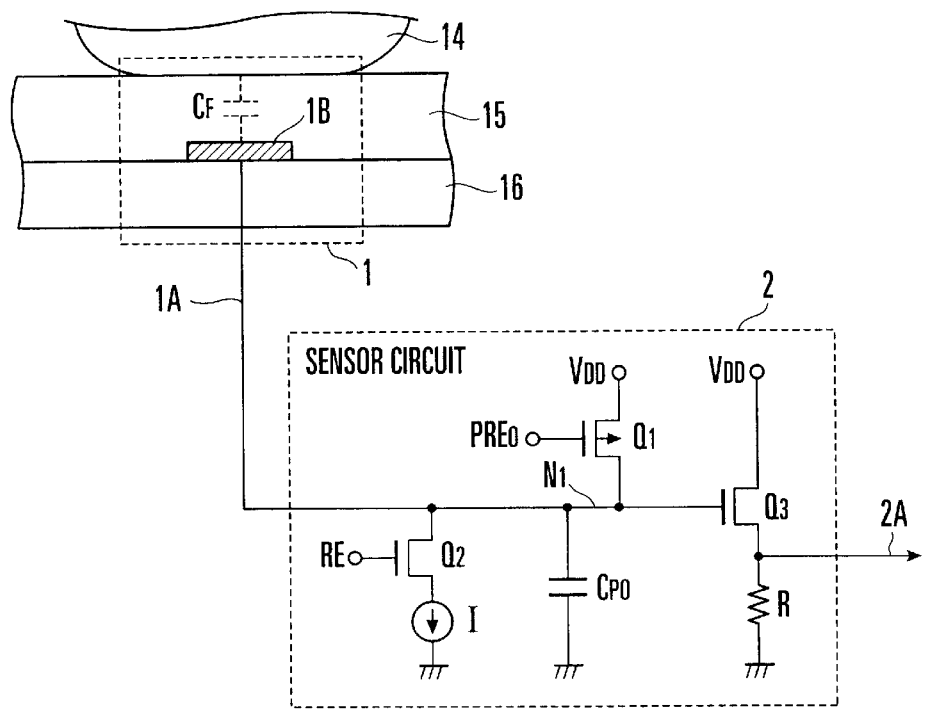
FIG. 37 is a block diagram showing the detailed arrangement of a sensor cell shown in FIG. 36.
Figure 38:
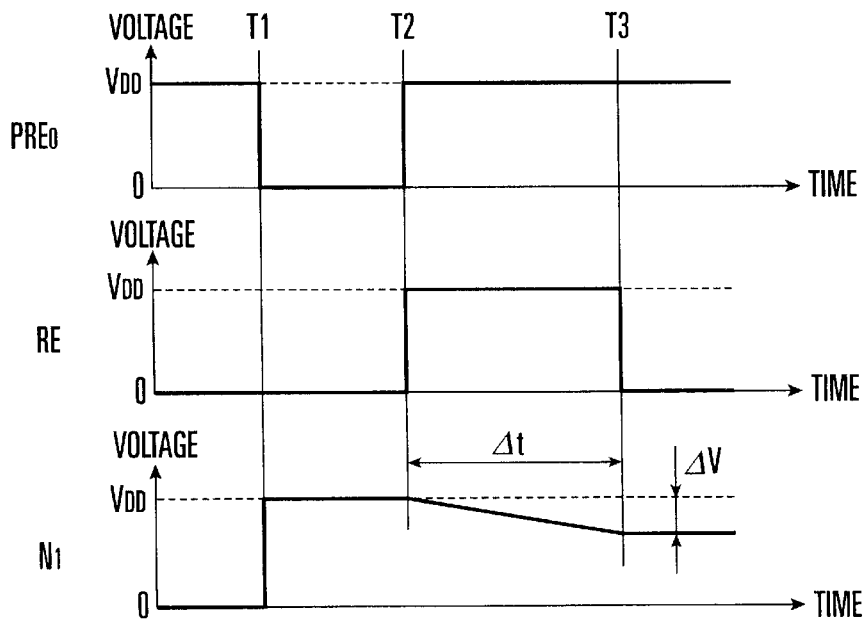
FIG. 38 is an operation timing chart of the sensor cell shown in FIG. 36.

The sensor cells 11 of the small shape recognizing capacitive sensor device 10 shown in FIG. 3 have identical structures. As in the above-described embodiment, each sensor cell 11 is formed from a detection element 1, sensor circuit 2, and calibration circuit 3. As the main characteristic feature, the output level of each sensor cell 11 is adjusted using the calibration circuit 3. This sensor cell is different from the conventional sensor cell (see FIG. 36) described above mainly in that the calibration circuit 3, signal processing circuit 5, and control line $L_C$ are provided.

The sensor cell 11 is formed from the detection element 1, sensor circuit 2, and calibration circuit 3. The detection element 1 is an element for converting the surface shape into an electrical signal. The sensor circuit 2 is a circuit for measuring an electric change amount 1A from the detection element 1, which changes depending on the surface shape.

To correct, i.e., calibrate the output level of each sensor cell 11, a reference sample having no three-dimensional pattern is detected by the sensor cells 11 as an object to be measured, or detection is performed without placing anything on the sensor cells, thereby causing the sensor cells 11 to detect the same measurement value. The signal output from each sensor cell 11 is input to an A/D conversion circuit 4 through a data line $L_D$ and output as a digital output signal 4A.

The digital output signal 4A output from the A/D conversion circuit 4 is also input to the signal processing circuit 5. The signal processing circuit 5 compares the digital output signal 4A output from the A/D conversion circuit 4 with a digital output signal to be output (to be referred to as an expectation value hereinafter) and calculates an adjustment parameter for adjusting the detection sensitivity of the sensor circuit 2. The calibration circuit 3 is controlled using a control line $L_C$ on the basis of the calculated adjustment parameter. The data line $L_D$ and control line $L_C$ are shared (commonly used) by the sensor cells 11. The sensor cells 11 are sequentially selected, output signals 2A from the sensor cells 11 are sequentially input to the A/D conversion circuit 4, and the calibration circuit 3 in each sensor cell 11 is controlled by the signal processing circuit 5. This operation is performed once or repeated a plurality of number of times for each sensor cell 11 whereby the sensitivity of each sensor circuit 2 is adjusted, and the performance of the sensor cells 11 is uniformed.

In this case, the signal processing circuit 5 has a comparison circuit 6 and calibration reference signal generation circuit 7 described with reference to FIG. 2. In this example, when the input signal is a digital signal, and the digital signal is to be directly input to the comparison circuit 6, a known digital comparison circuit is used as the comparison circuit. If the comparison circuit is a normal analog comparison circuit, the digital signal is D/A-converted and then supplied to the comparison circuit. This also applies to the calibration reference signal generation circuit.

Figure 4:
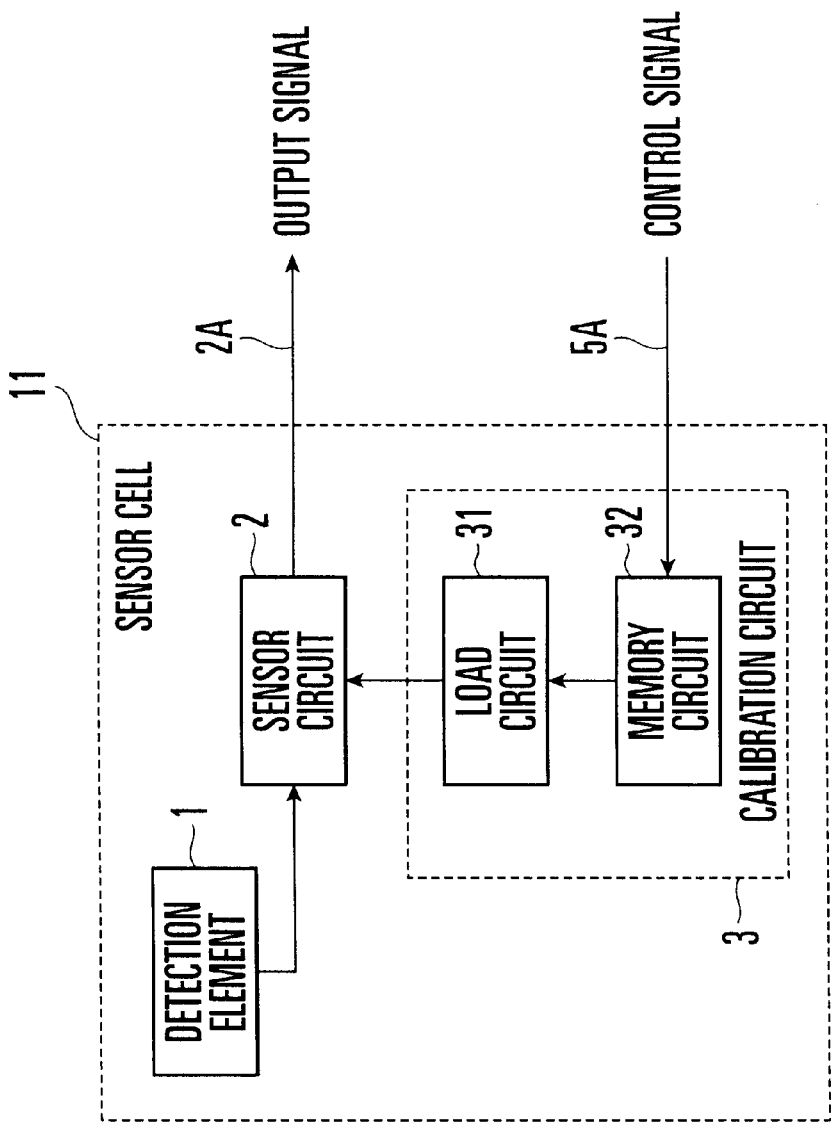
FIG. 4 is a block diagram showing the arrangement of a calibration circuit shown in FIG. 3.

FIG. 4 shows an implementation example of the calibration circuit 3 shown in FIG. 3. The calibration circuit 3 comprises a load circuit 31 and memory circuit 32. The adjustment parameter calculated by the signal processing circuit 5 is written in the memory circuit 32. The load circuit 31 is controlled by the data written in the memory circuit 32.

Figure 5:
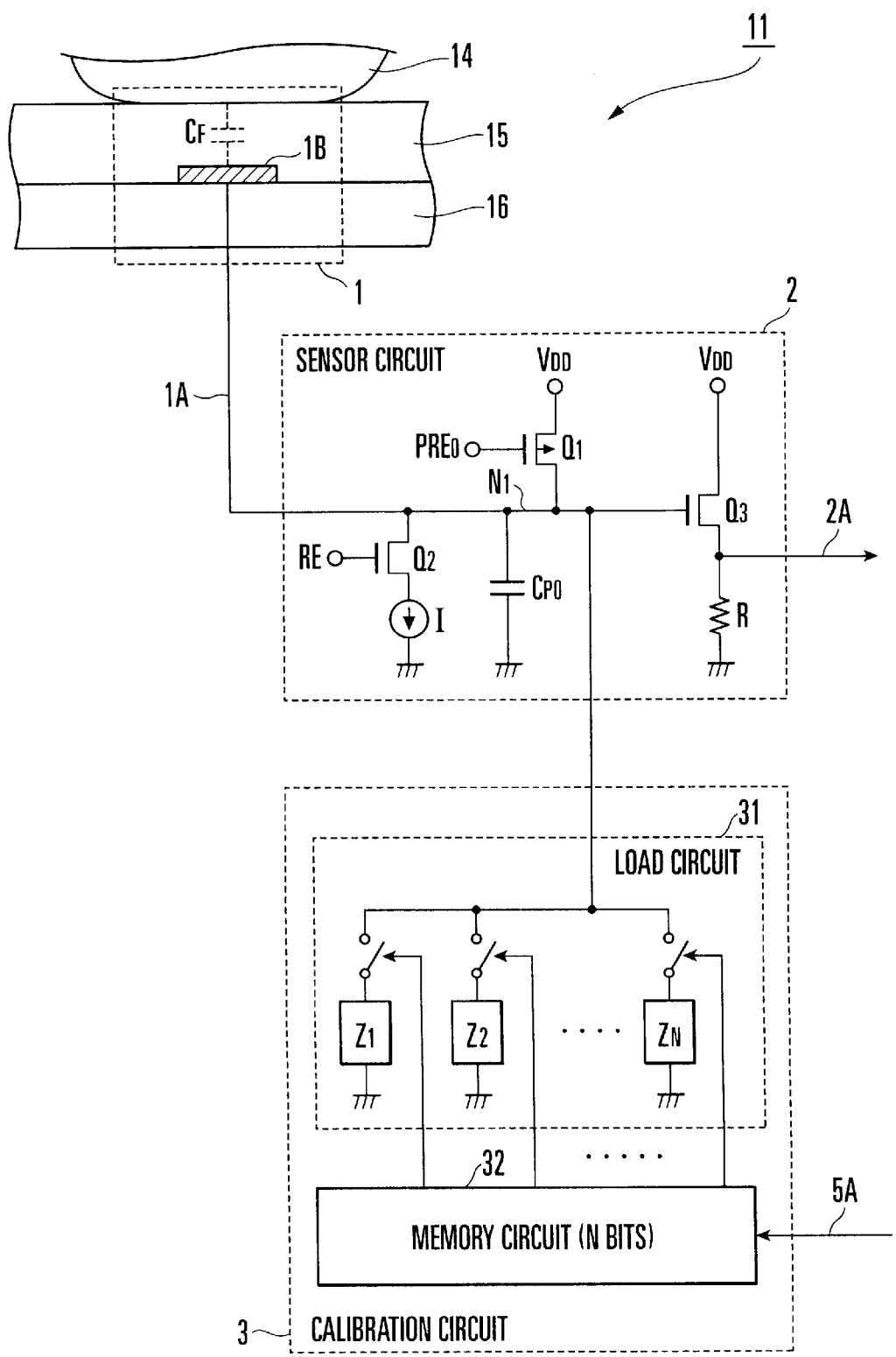
FIG. 5 is a block diagram showing the circuit arrangement of a sensor cell having a calibration circuit.

FIG. 5 shows the detailed circuit arrangement of the sensor cell 11 having the calibration circuit 3. In the load circuit 31, N (N is a natural number) load elements $Z_1$ to $Z_N$ are connected to the sensor circuit 2 through switches. The memory circuit 32 is an N-bit memory circuit and ON/OFF-controls each switch in the load circuit 31 on the basis of written data. The memory circuit 32 can be implemented by an SRAM, DRAM, or writable nonvolatile memory.

Figure 6:
FIG. 6 is a view showing the arrangement of a switch.

Each switch can be implemented by a MOSFET operated by a switching control signal SW, as shown in FIG. 6. Although an example using an Nch MOSFET is shown in FIG. 6, a Pch MOSFET or Pch and Nch MOSFETs may be used.

Figure 7A:
FIGS. 7A and 7B are views showing arrangements of a load element.
Figure 7B:

As the load elements $Z_1$ to $Z_N$, a capacitive element or resistive element shown in FIG. 7A or 7B can be used. When the shape of the object to the recognized is detected by the detection element 1 as a change in capacitance value, a capacitive element is used as the load element, which is implemented by a PIP capacitance, MIM capacitance, or MOS capacitance as shown in FIG. 7A. When the surface shape is detected by the detection element 1 as a change in resistance value, a resistive element is used as the load element, which is implemented by a polysilicon resistance or MOS resistance as shown in FIG. 7B. Although examples using an Nch MOSFET are shown in FIGS. 7A and 7B, a Pch MOSFET may be used.

The operation principle of the calibration circuit 3 will be briefly described. For example, assume that the value of a parasitic capacitance $C_{P0}$ generated in the sensor circuit 2 shown in FIG. 5 changes for each sensor cell due to the process variation. Capacitive elements are used as the load elements $Z_1$ to $Z_N$, and an appropriate number of switches are turned on and connected to the sensor circuit 2. When data for equalizing the parasitic capacitance $C_{P0}$ connected to the sensor circuit 2 and the sum of the load elements $Z_1$ to $Z_N$ formed from capacitive elements for the individual sensor circuits 2 is written in the memory circuit 32, the variation in performance between the sensor cells 11 due to the process variation is eliminated, and consequently, the performance of the sensor cells 11 can be uniformed.

Figure 8:
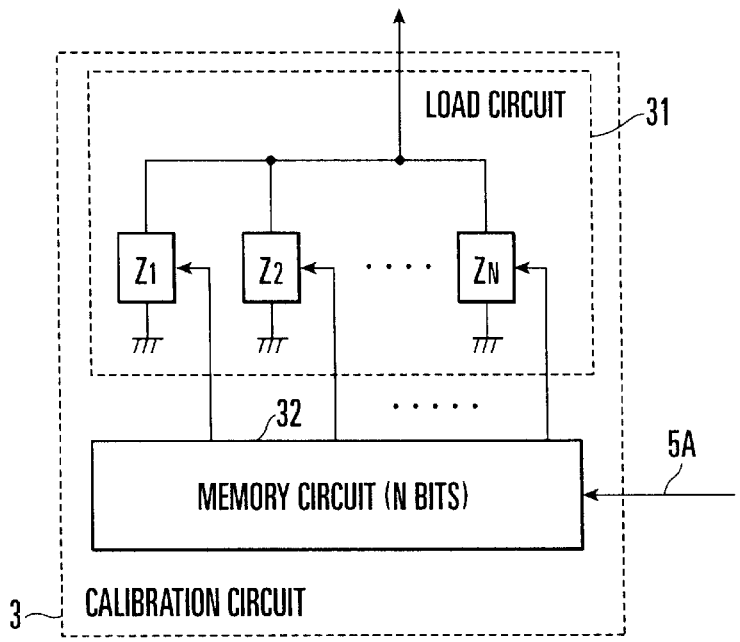
FIG. 8 is a block diagram showing the arrangement of a calibration circuit.

FIG. 8 shows another circuit arrangement of the calibration circuit 3. In the load circuit 31, N (N is a natural number) load elements $Z_1$ to $Z_N$ are connected to the sensor circuit 2. The load elements can individually be controlled to an active or inactive state. The memory circuit 32 is an N-bit memory circuit and controls the active state of each load element on the basis of written data. The memory circuit 32 can be implemented by an SRAM, DRAM, or writable nonvolatile memory. As the load elements selectively controlled to the active or inactive state, a capacitive element or resistive element shown in FIG. 9A or 9B can be used.

Figure 9A:
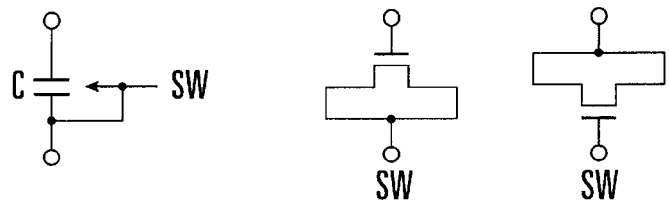
FIGS. 9A and 9B are another arrangement of the load element.
Figure 9B:

The capacitive element can be implemented by controlling the potential or potentials of the gate terminal or source and drain terminals of a MOS capacitance which is set in the active or inactive state by the switching control signal SW as shown in FIG. 9A. Similarly, the resistive element can be implemented by a MOS resistance as shown in FIG. 9B. Although examples using an Nch MOSFET are shown in FIGS. 9A and 9B, a Pch MOSFET may be used. When the load elements which can be controlled to the active or inactive state are used, the sensitivity can be more accurately adjusted because the parasitic capacitance or parasitic resistance of a switch is not connected, unlike the arrangement shown in FIG. 5 which uses switches.

(Third Embodiment)

A small shape recognizing capacitive sensor device according to the third embodiment of the present invention will be described next with reference to FIG. 10. The small shape recognizing capacitive sensor device shown in FIG. 10 is different from the above-described second embodiment (see FIG. 3) in that a holding circuit 52 is used, and no control line $L_C$ is used in FIG. 10.

To calibrate each sensor cell 11, a reference sample having no three-dimensional pattern is detected by the sensor cells 11 as an object to be measured, or detection is performed without placing anything on the sensor cells 11, thereby causing the sensor cells 11 to detect the same measurement value. An output signal 2A output from each sensor cell 11 is input to an A/D conversion circuit 4 through a data line $L_D$ and output as a digital output signal 4A.

The digital output signal 4A output from the A/D conversion circuit 4 is also input to a signal processing circuit 5. The signal processing circuit 5 compares the digital output signal 4A output from the A/D conversion circuit 4 with an expectation value and calculates an adjustment parameter for the detection sensitivity of a sensor circuit 2. The calculated adjustment parameter is held by the holding circuit 52. After the signal output from the sensor cells 11 is ended, a calibration circuit 3 is controlled through the data line $L_D$ on the basis of the data held by the holding circuit 52. The data line $L_D$ is shared by the sensor cells 11. The sensor cells 11 are sequentially selected, and the above operation is performed. This operation is performed once or repeated a plurality of number of times for each sensor cell whereby the sensitivity of each sensor circuit 2 is adjusted, and the performance of the sensor cells 11 is uniformed. Hence, unlike the second embodiment, one line can be commonly used as the data line $L_D$ and control line $L_C$, and the number of wires can be decreased.

Figure 10:
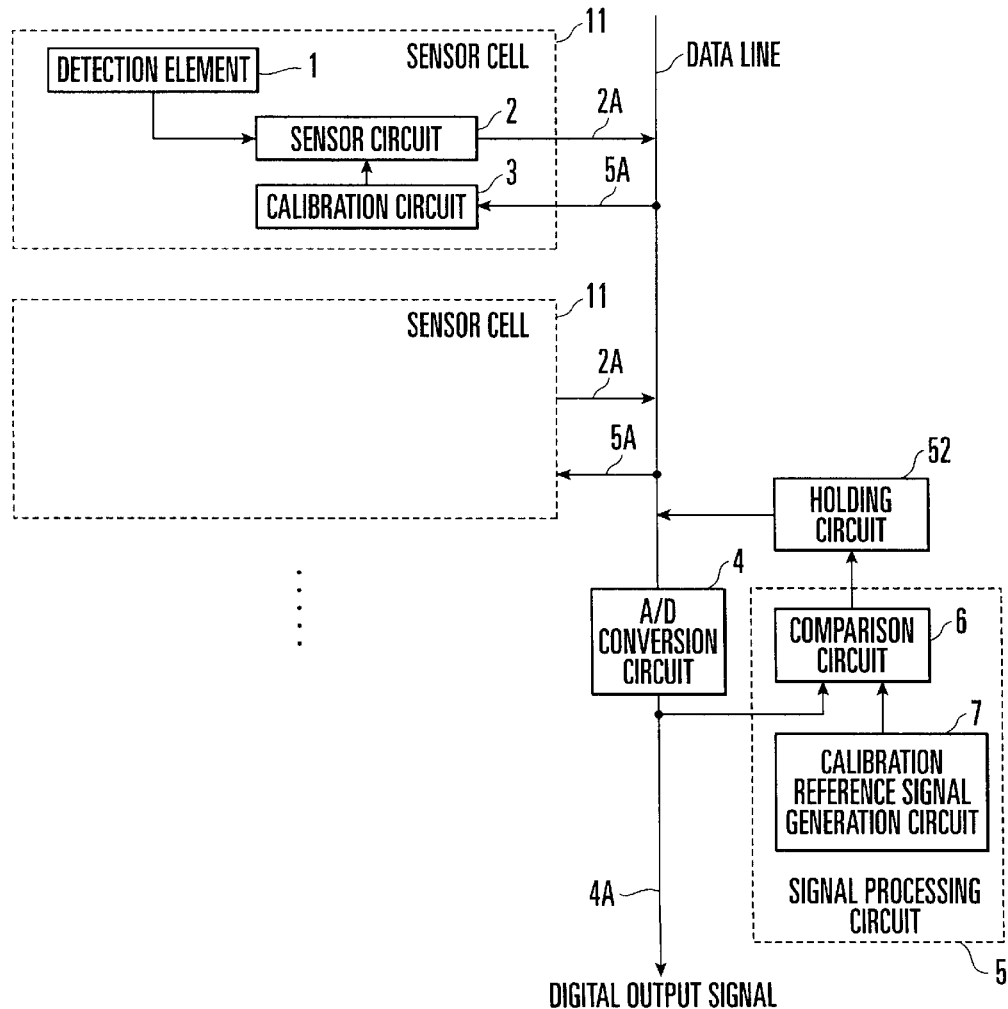
FIG. 10 is a block diagram showing the third embodiment of the present invention.

In the third embodiment as shown in FIG. 10, the signal processing circuit 5 has a comparison circuit 6 and calibration reference signal generation circuit 7 described with reference to FIG. 2. In this example, when the input signal is a digital signal, and the digital signal is to be directly input to the comparison circuit 6, a known digital comparison circuit is used as the comparison circuit. If the comparison circuit is a normal analog comparison circuit, the digital signal is D/A-converted and then supplied to the comparison circuit. This also applies to the calibration reference signal generation circuit.

(Fourth Embodiment)

Figure 11:
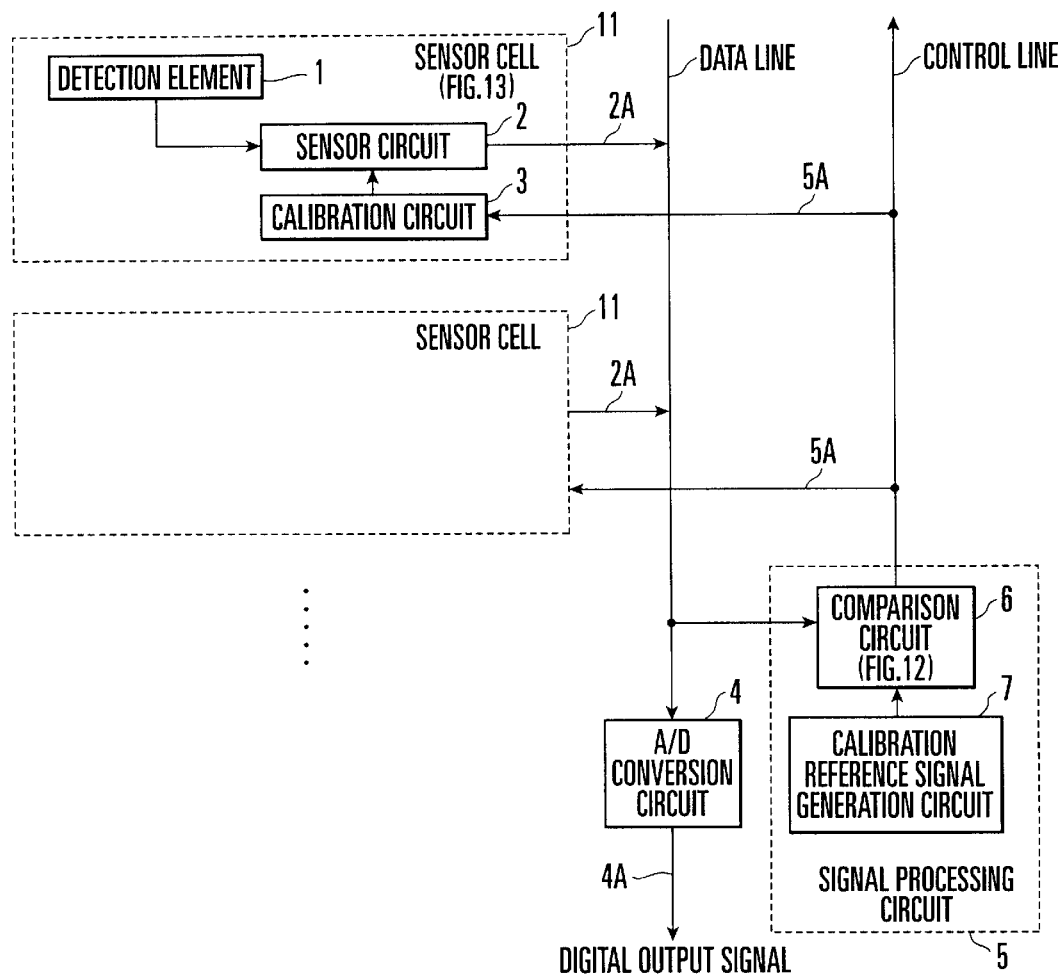
FIG. 11 is a block diagram showing the fourth embodiment of the present invention.

A small shape recognizing capacitive sensor device according to the fourth embodiment of the present invention will be described next with reference to FIG. 11. The small shape recognizing capacitive sensor device according to the fourth embodiment of the present invention shown in FIG. 11 is different from the above-described second embodiment (see FIG. 3) in that the signal from an analog signal data line $L_D$ is input to the input side of a comparison circuit 6 of a signal processing circuit 5.

To calibrate each sensor cell 11, a reference sample having no three-dimensional pattern is detected by the sensor cells 11 as an object to be measured, or detection is performed without placing anything on the sensor cells, thereby causing the sensor cells 11 to detect the same measurement value.

An output signal 2A output from each sensor cell 11 is input to an A/D conversion circuit 4 through the data line $L_D$ and output as a digital output signal 4A. Simultaneously, the output signal 2A from each sensor cell 11 is also input to the comparison circuit 6. The comparison circuit 6 compares the analog output signal 2A output from the sensor cell 11 with a signal to be output, i.e., a reference signal. A calibration circuit 3 is controlled through a control line $L_C$ on the basis of the comparison result.

Figure 12:
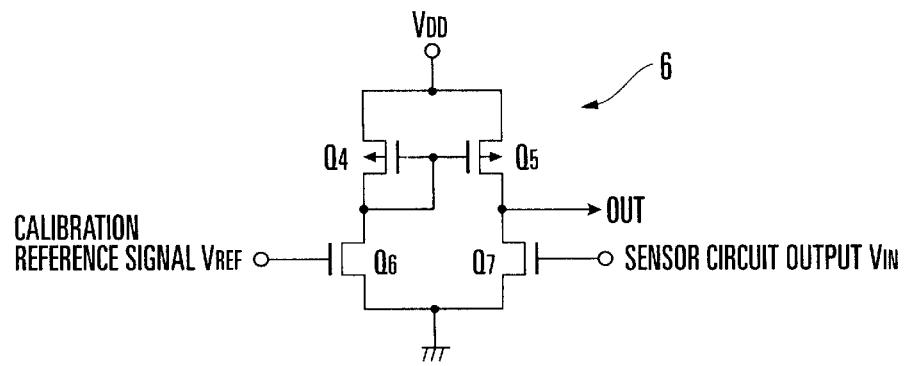
FIG. 12 is a circuit diagram showing the arrangement of a comparison circuit shown in FIG. 11.

For example, when the analog output signal 2A output from the sensor cell 11 is a voltage signal, a general comparison circuit using Pch MOSFETs $Q_4$ and $Q_5$ and Nch MOSFETs $Q_6$ and $Q_7$ as shown in FIG. 12 may be used to implement the comparison circuit 6.

In the comparison circuit 6 shown in FIG. 12, a calibration reference signal is a reference voltage $V_{REF}$, and an input voltage $V_{IN}$ of the output signal 2A from the sensor cell 11 is compared with the reference voltage $V_{REF}$. A control signal 5A of high level or low level is output as an output OUT from the comparison circuit 6 in accordance with the comparison result. The calibration circuit 3 is controlled by the control signal 5A. The data line $L_D$ and control line $L_C$ are shared by the sensor cells 11. The sensor cells 11 are sequentially selected, and the output signals 2A from the sensor cells 11 sequentially control the calibration circuits 3 in the sensor cells by the comparison circuit 6.

This operation is performed once or repeated a plurality of number of times for each sensor cell whereby the output level of each sensor circuit 2 is adjusted, and the performance of the sensor cells 11 is uniformed. Hence, the circuit for comparison can be implemented in a smaller scale than that of the signal processing circuit 5 which calculates the adjustment parameter by comparing the digital output signal 4A in the second embodiment. In addition, since the calibration circuit 3 can be controlled without intervening the A/D conversion circuit 4, high-speed calibration can be performed as a result.

Figure 13:
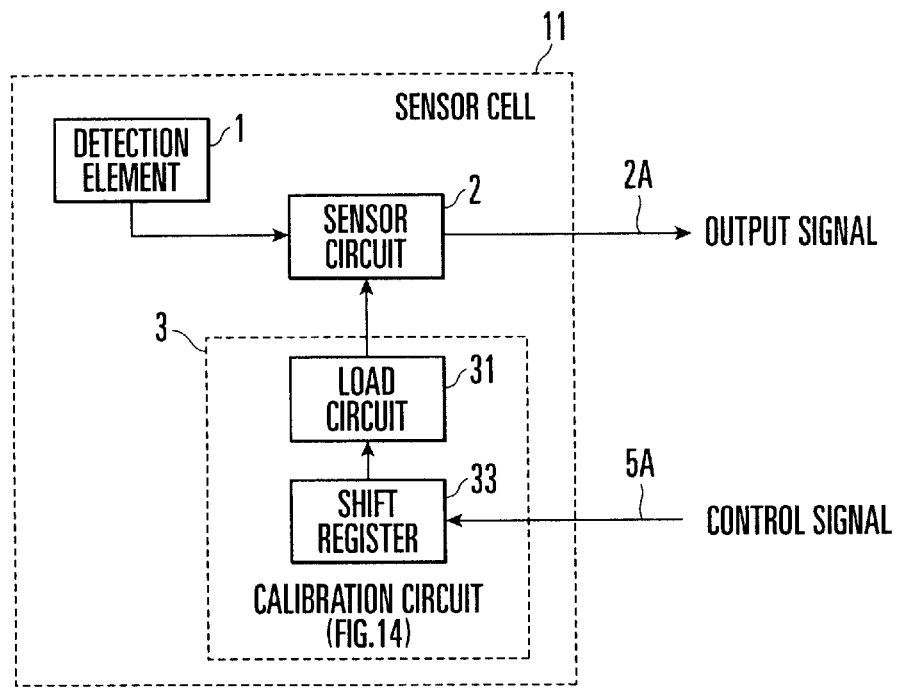
FIG. 13 is a block diagram showing the arrangement of the calibration circuit using the comparison circuit.

FIG. 13 shows the arrangement of a sensor cell including a calibration circuit when a comparison circuit is used, as in the fourth embodiment (see FIG. 11). The calibration circuit 3 is formed from a load circuit 31 and shift register circuit 33. The control signal 5A output from the comparison circuit 6 is written in the shift register 33, and the load circuit 31 is controlled on the basis of the data written in the shift register 33.

Figure 14:
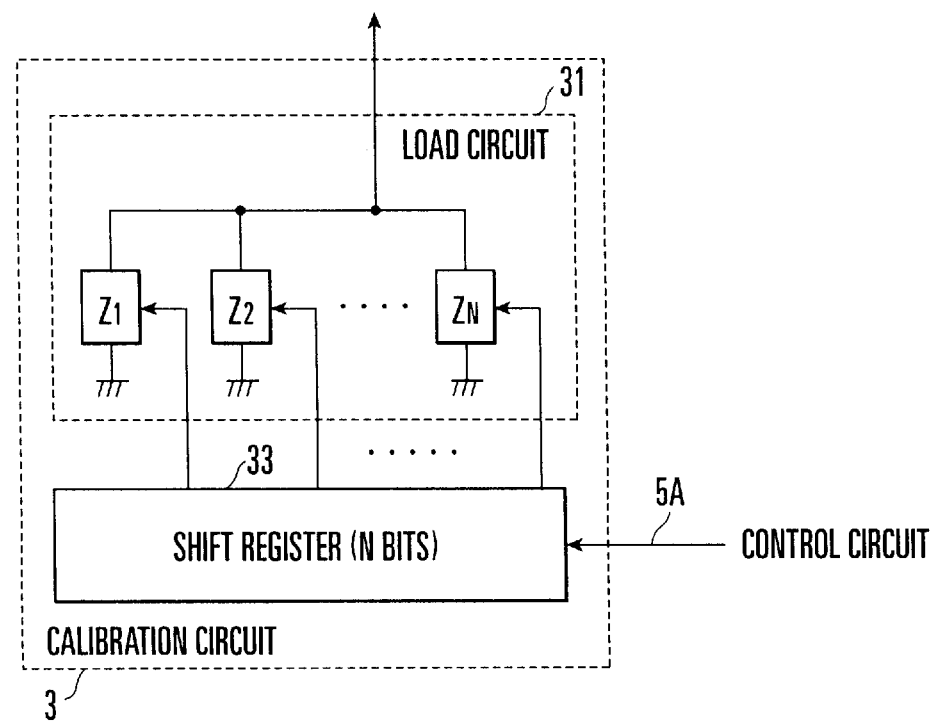
FIG. 14 is a block diagram showing the arrangement of a sensor cell having a calibration circuit using a shift register.

FIG. 14 shows the specific example of the calibration circuit 3 shown in FIG. 13. In the load circuit 31, N (N is a natural number) load elements $Z_1$ to $Z_N$ are connected to the sensor circuit 2. The load elements can individually be controlled to an active or inactive state. As the load circuit 31, the load circuit using switches shown in FIG. 5 may be used.

The shift register 33 is an N-bit shift register which controls the active state of the load circuit 31 on the basis of data written in the shift register 33. The operation principle of the calibration circuit 3 having the shift register 33 will be briefly described. The value of the shift register 33 is set in advance to an initial set value that controls all the load elements $Z_1$ to $Z_N$ to the inactive state. In the first sense operation, when the output signal 2A from the sensor circuit 2 does not match the reference signal. (e.g., when the output signal 2A is smaller than the reference signal), the comparison circuit 6 outputs, as data, the control signal 5A for activating a load element (write data: e.g., "1" for the shift register 33), and this data is written in the shift register 33 by one bit.

When the output signal 2A does not match the reference signal (e.g., when the output signal 2A is smaller than the reference signal) even in the second sense operation, the comparison circuit 6 outputs, as data, the control signal 5A for activating a load element, as in the preceding operation. This data is written in the shift register 33 as another bit data. The shift register 33 has a function of shifting one preceding data. As a result, two load elements are activated. Such operation is repeated until the output signal 2A matches the reference signal and, more strictly, until the output signal 2A from the sensor cell 11 exceeds the reference signal (e.g., becomes larger than the reference signal).

When the output signal 2A exceeds the level of the reference signal, the control signal 5A (for the shift register 33, write data: e.g., "0") for controlling the load element to an inactive state is output as data from the comparison circuit 6 to the shift register 33. This data is only additionally written in the shift register 33 without controlling a new load element to the active state, and no more load elements are connected to the sensor circuit 2. Hence, the load elements are sequentially connected by the control signal 5A from the comparison circuit 6, and the output signal 2A equal to the reference signal is output from the sensor cell 11. In this case, control may be executed to inhibit the write in the shift register using a change in control signal 5A from the comparison circuit 6.

Figure 15:
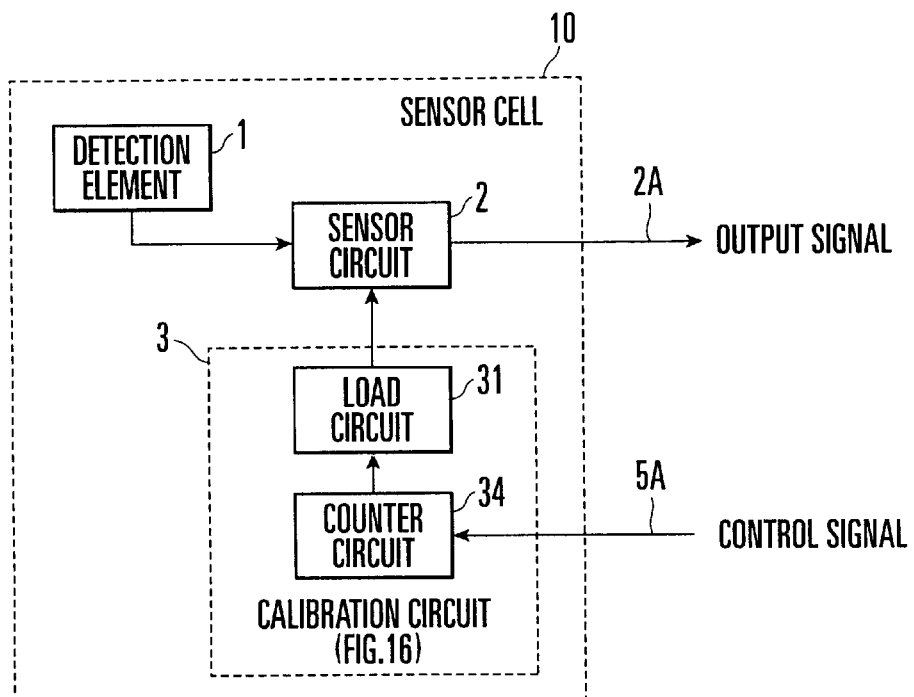
FIG. 15 is a block diagram showing another arrangement of the calibration circuit using the comparison circuit.

FIG. 15 shows another arrangement of the calibration circuit when the comparison circuit is used, as in the fourth embodiment (see FIG. 11). The calibration circuit 3 is formed from the load circuit 31 and counter circuit 34. The counter circuit 34 is controlled by the signal output from the comparison circuit 6, and the load circuit is controlled by the data in the counter circuit 34.

Figure 16:
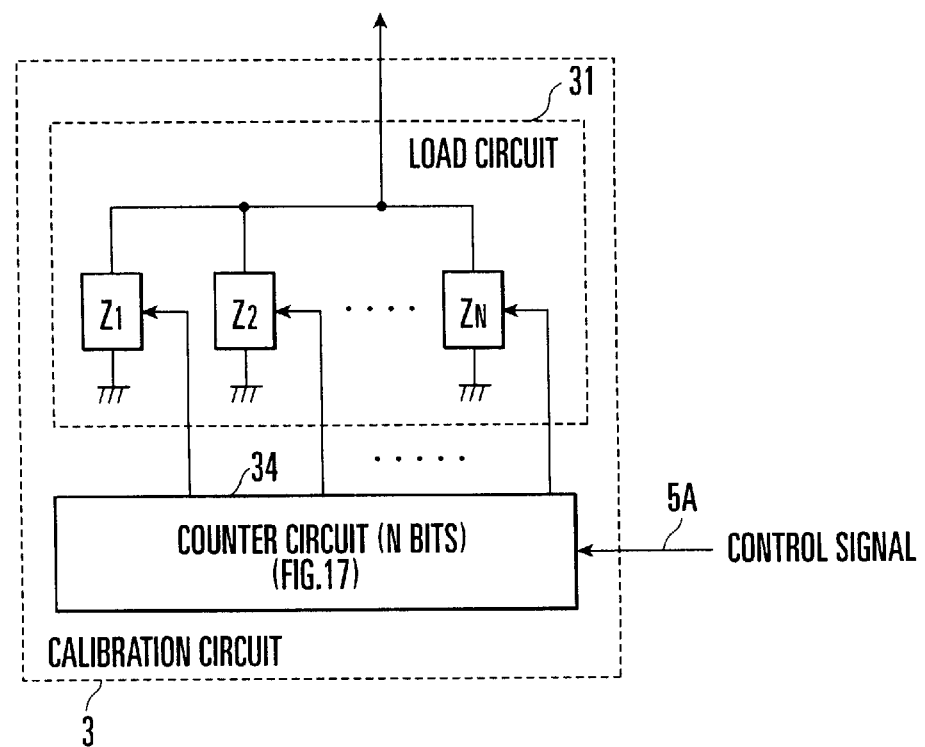
FIG. 16 is a block diagram showing the detailed arrangement of a sensor cell having a calibration circuit using a counter circuit.

FIG. 16 shows the specific example of a sensor cell having a calibration circuit using the counter circuit in FIG. 15. In the load circuit 31, N (N is a natural number) load elements $Z_1$ to $Z_N$ are connected to the sensor circuit 2. The load elements can individually be controlled to an active or inactive state. As the load circuit 31, the load circuit using switches shown in FIG. 5 may be used. The counter circuit 34 is an N-bit counter circuit, and the active state of the load circuit 31 is controlled on the basis of data in the counter circuit 34.

The operation principle of the calibration circuit using the counter circuit 34 will be briefly described. The value of the counter circuit 34 is set in advance to an initial set value that controls all the load elements $Z_1$ to $Z_N$ to the inactive state. In the first sense operation, when the output signal 2A from the sensor circuit 2 does not match the reference signal (e.g., when the output signal 2A is smaller than the reference signal), the output, i.e., the control signal 5A from the comparison circuit 6 changes. As the control signal 5A changes, the counter circuit 34 is incremented by one. As a result, the data in the counter circuit changes to activate one load element. The output signal from the comparison circuit is returned to the initial set value.

When the output signal 2A does not match the reference signal (e.g., when the output signal 2A is smaller than the reference signal) even in the second sense operation, the control signal 5A from the comparison circuit 6 changes again. The counter circuit 34 is further incremented by one. If, e.g., $Z_1=Z$, $Z_2=2Z$, $Z_3=4Z$, ..., $Z_N=2^{(N-1)}Z$ are set, and the load elements $Z_1$ to $Z_N$ are sequentially controlled from the lower bit of the counter circuit 34, the value of the load element connected to the sensor circuit 2 increases by Z for every increment.

Such operation is repeated until the output signal 2A from the sensor cell 11 matches the reference signal and, more strictly, until the output signal 2A exceeds the reference signal (e.g., becomes larger than the reference signal). If the signals match, the output from the comparison circuit 6 does not change. For this reason, the counter circuit 34 is not incremented by the control signal 5A anymore, and no more load elements are connected to the sensor circuit 2.

When the counter circuit 34 is used, control can be simplified as compared to the case wherein the shift register is used. When the values of the load elements are set as described above, the number of settings of the load circuit can be increased by $2^{(N-1)}-N$ while the number of elements is kept unchanged. In addition, the number of bits of the counter circuit 34 can be decreased even when the number of settings of load circuit is kept unchanged, and the circuit scale can be made smaller than that for the shift register.

Figure 17:
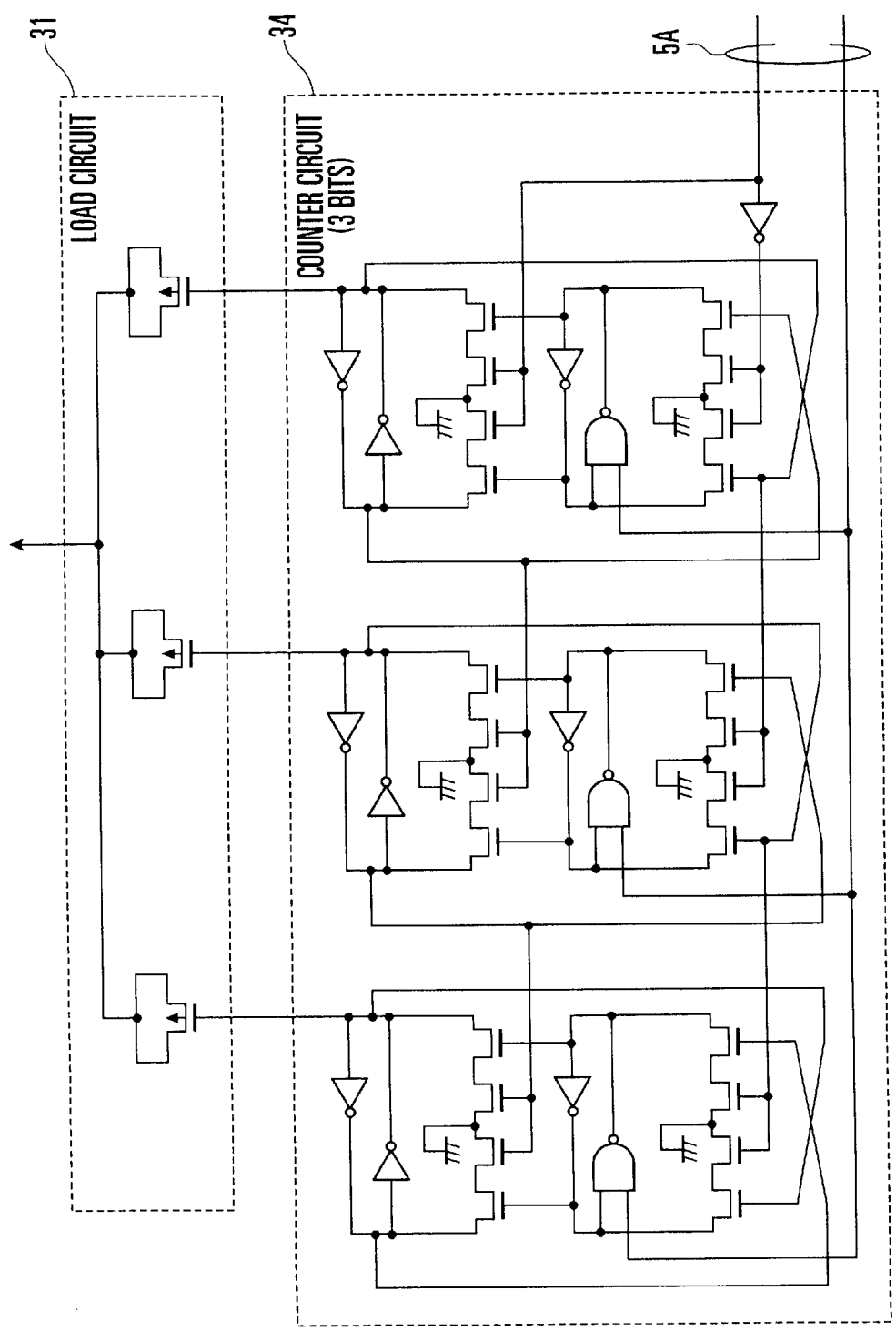
FIG. 17 is a block diagram showing the arrangement of the counter circuit.

FIG. 17 shows the arrangements of the counter circuit 34 and load circuit 31 shown in FIGS. 15 and 16. For the load circuit 31, the connection relationship given when a MOS capacitance is used as a load element which can be selectively controlled to the active or inactive state is also shown. The counter circuit 34 is a counter circuit with 3-bit clear and is formed from a RAM-type latch circuit. The circuit scale can be reduced as compared to a case wherein a latch circuit formed from a transfer gate or clocked CMOS circuit is used. Especially, since the sensor cell 11 used in a surface shape recognizing sensor device is as small as 50-μm square, the calibration circuit arranged in the sensor cell is preferably small. For this reason, when the counter circuit shown in FIG. 17 is used, the calibration circuit can be made compact. Even the above-described shift register 33 can have a small circuit scale when it is implemented using a RAM-type latch circuit.

(Fifth Embodiment)

Figure 18:
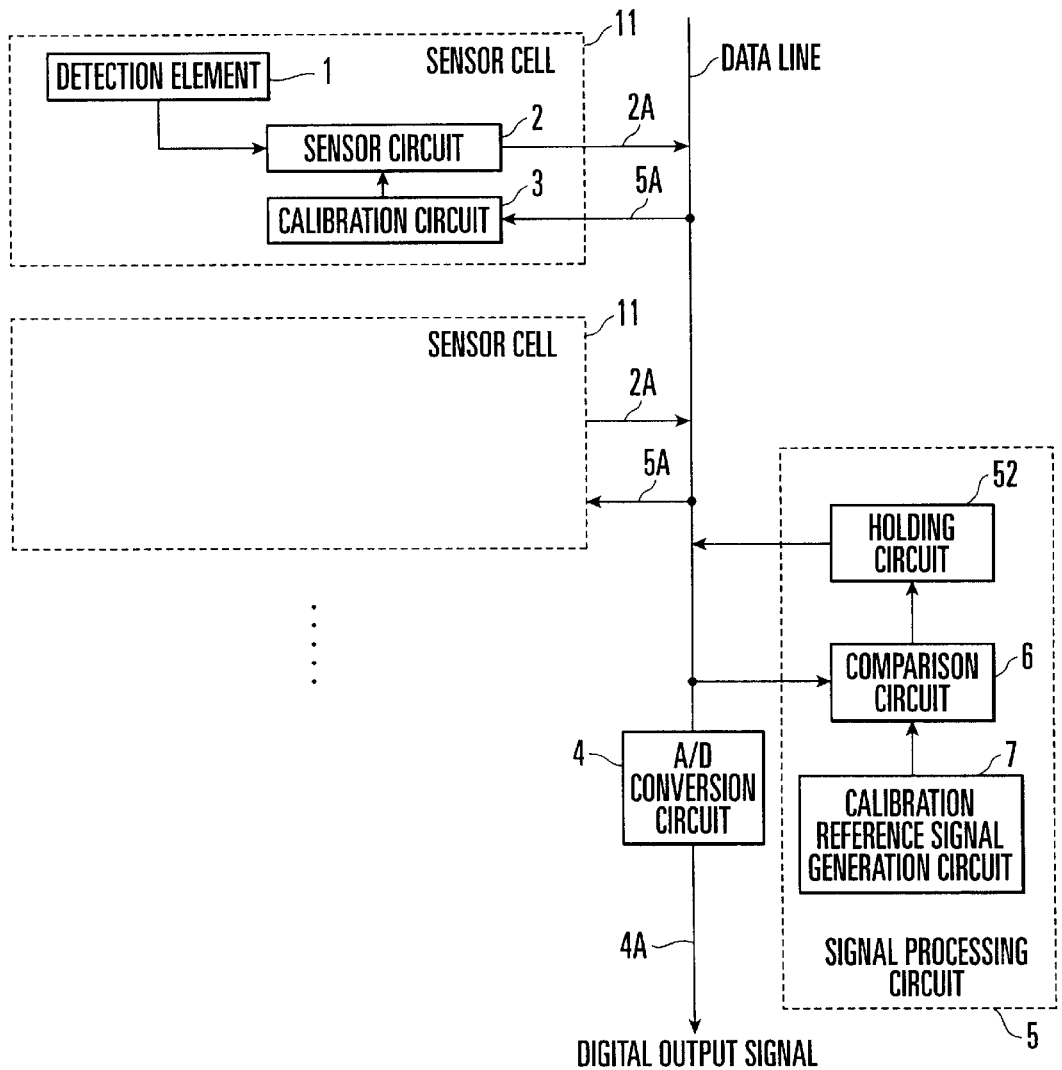
FIG. 18 is a block diagram showing the fifth embodiment of the present invention.

A small shape recognizing capacitive sensor device 10 according to the fifth embodiment of the present invention will be described next with reference to FIG. 18. The fifth embodiment of the present invention shown in FIG. 18 is different from the above-described fourth embodiment (see FIG. 11) in that a holding circuit 52 is used, and no control line $L_C$ is used. To calibrate each sensor cell 11, a reference sample having no three-dimensional pattern is detected by the sensor cells as an object to be measured, or detection is performed without placing anything on the sensor cells, thereby causing the sensor cells 11 to detect the same measurement value.

An output signal 2A from each sensor cell 11 is input to an A/D conversion circuit 4 through a data line $L_D$. Simultaneously, the output signal 2A from the sensor cell 11 is also input to a comparison circuit 6. The comparison circuit 6 compares the analog output signal 2A with a reference signal from the calibration reference signal generation circuit. The comparison result is held by the holding circuit 52. After the signal output from the sensor cells 11 is ended, the comparison result held by the holding circuit 52 is output to a calibration circuit 3 through the data line $L_D$ as a control signal 5A, and the calibration circuit 3 is controlled. The data line $L_D$ is shared by the plurality of sensor cells 11. The sensor cells 11 are sequentially selected, and the above operation is performed. This operation is performed once or repeated a plurality of number of times for each sensor cell whereby the sensitivity of each sensor circuit 2 is adjusted, and the performance of the sensor cells 11 is uniformed. Hence, unlike the fourth embodiment, one line can be commonly used as the data line $L_D$ and control line $L_C$, and the number of wires can be decreased.

(Sixth Embodiment)

Figure 19:
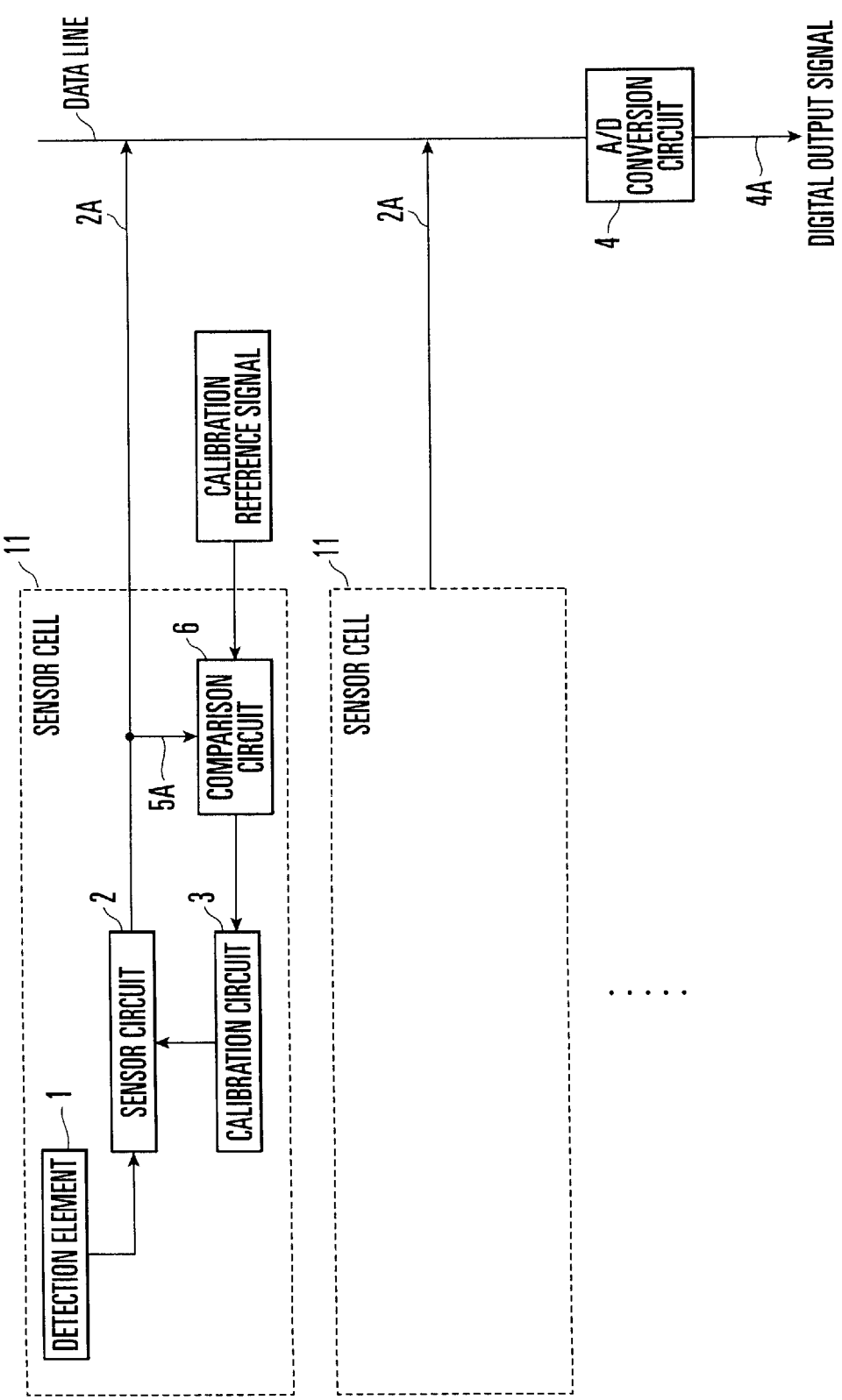
FIG. 19 is a block diagram showing the sixth embodiment of the present invention.

A small shape recognizing capacitive sensor device 10 according to the sixth embodiment of the present invention will be described next with reference to FIG. 19. The small shape recognizing capacitive sensor device 10 according to the sixth embodiment of the present invention shown in FIG. 19 is different from the fifth embodiment (see FIG. 18) in that a comparison circuit 6 is incorporated in a sensor cell 11 and a holding circuit 52 is not used. To calibrate each sensor cell 11, a reference sample having no three-dimensional pattern is detected by the sensor cells 11 as an object to be measured, or detection is performed without placing anything on the sensor cells, thereby causing the sensor cells 11 to detect the same measurement value.

An output signal 2A output from each sensor cell 11 is input to an A/D conversion circuit 4 through a data line $L_D$ and output as a digital output signal 4A. Simultaneously, the output signal 2A is also input to the comparison circuit 6 in the sensor cell 11. The comparison circuit 6 compares the analog output signal 2A with a reference signal from the calibration reference signal generation circuit and controls a calibration circuit 3 on the basis of the comparison result. The data line $L_D$ is shared by the plurality of sensor cells 11. The sensor cells 11 are sequentially selected, and the above operation is performed. This operation is performed once or repeated a plurality of number of times for each sensor cell whereby the output level of each sensor circuit 2 is adjusted, and the performance of the sensor cells is uniformed.

Hence, unlike the above-described fifth embodiment, the calibration circuit 3 can be controlled by the comparison circuit 6 without intervening the data line $L_D$, high-speed calibration can be performed as a result. In addition, even when a plurality of sensor cells 11 are simultaneously selected, the calibration can be parallelly performed for each sensor cell 11, and consequently, high-speed calibration can be performed.

(Seventh Embodiment)

Figure 20:
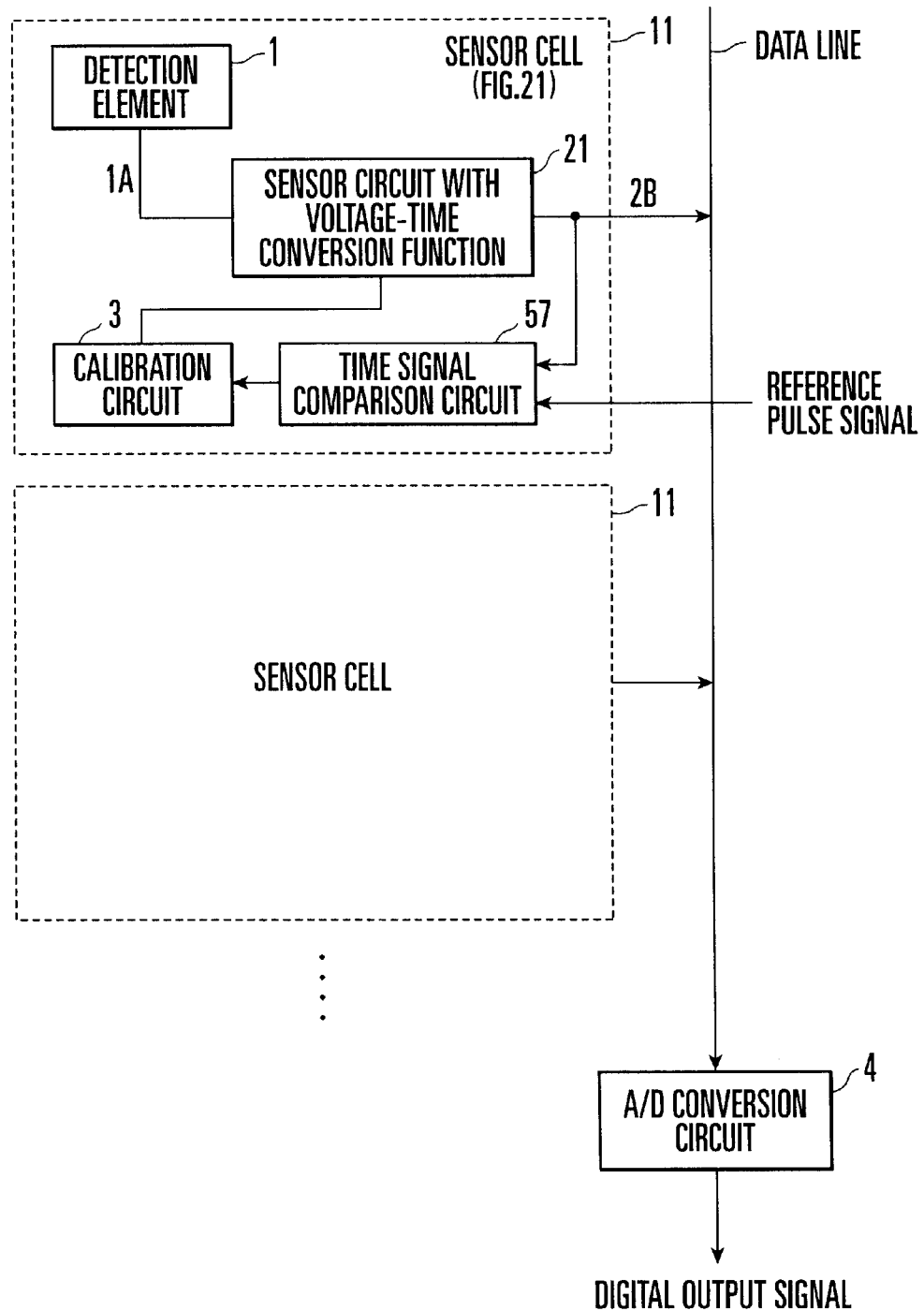
FIG. 20 is a block diagram showing the seventh embodiment of the present invention.

A small shape recognizing capacitive sensor device 10 according to the seventh embodiment of the present invention will be described next with reference to FIG. 20. The seventh embodiment of the present invention shown in FIG. 20 is different from the above-described sixth embodiment in that a sensor circuit 21 with voltage-time conversion function and time signal comparison circuit 57 are used as a sensor circuit in a sensor cell 11.

To calibrate each sensor cell 11, a reference sample having no three-dimensional pattern is detected by the sensor cells 11 as an object to be measured, or detection is performed without placing anything on the sensor cells, thereby causing the sensor cells 11 to detect the same measurement value.

The sensor circuit 21 with voltage-time conversion function converts a signal having analog information as a voltage value into a signal having analog information in the time-axis direction and outputs the signal (see FIG. 22B: Ts is the output time and time Ts changes). An output signal 2B is input to an A/D conversion circuit 4 through a data line $L_D$ and output as a digital output signal. Simultaneously, the output signal 2B is supplied to a calibration circuit 3 through the time signal comparison circuit 57 in the sensor cell. The time signal comparison circuit 57 corresponds to the comparison circuit 6 in FIG. 2 and obtains the time difference between the output signal 2B from the sensor circuit 21 and the reference pulse signal (see FIG. 22A) from the calibration reference signal generation circuit.

The time signal comparison circuit 57 compares the signal obtained by voltage-time conversion by the sensor circuit 21 with the reference pulse signal and sends a pulse signal (see FIG. 22C) representing the time difference to the calibration circuit. The calibration circuit 3 performs control operation such that the time difference between the reference pulse signal and the sensor circuit output becomes zero. The data line $L_D$ is shared by the plurality of sensor cells 11. The sensor cells 11 are sequentially selected, and the above operation is performed.

This operation is performed once or repeated a plurality of number of times for each sensor cell 11 whereby the sensitivity of each sensor circuit 21 is adjusted, and the performance of the sensor cells 11 is uniformed. As in the above-described fifth embodiment, even when a plurality of sensor cells 11 are simultaneously selected, the calibration can be parallelly performed for each sensor cell 11, and high-speed calibration can be performed.

Figure 21:
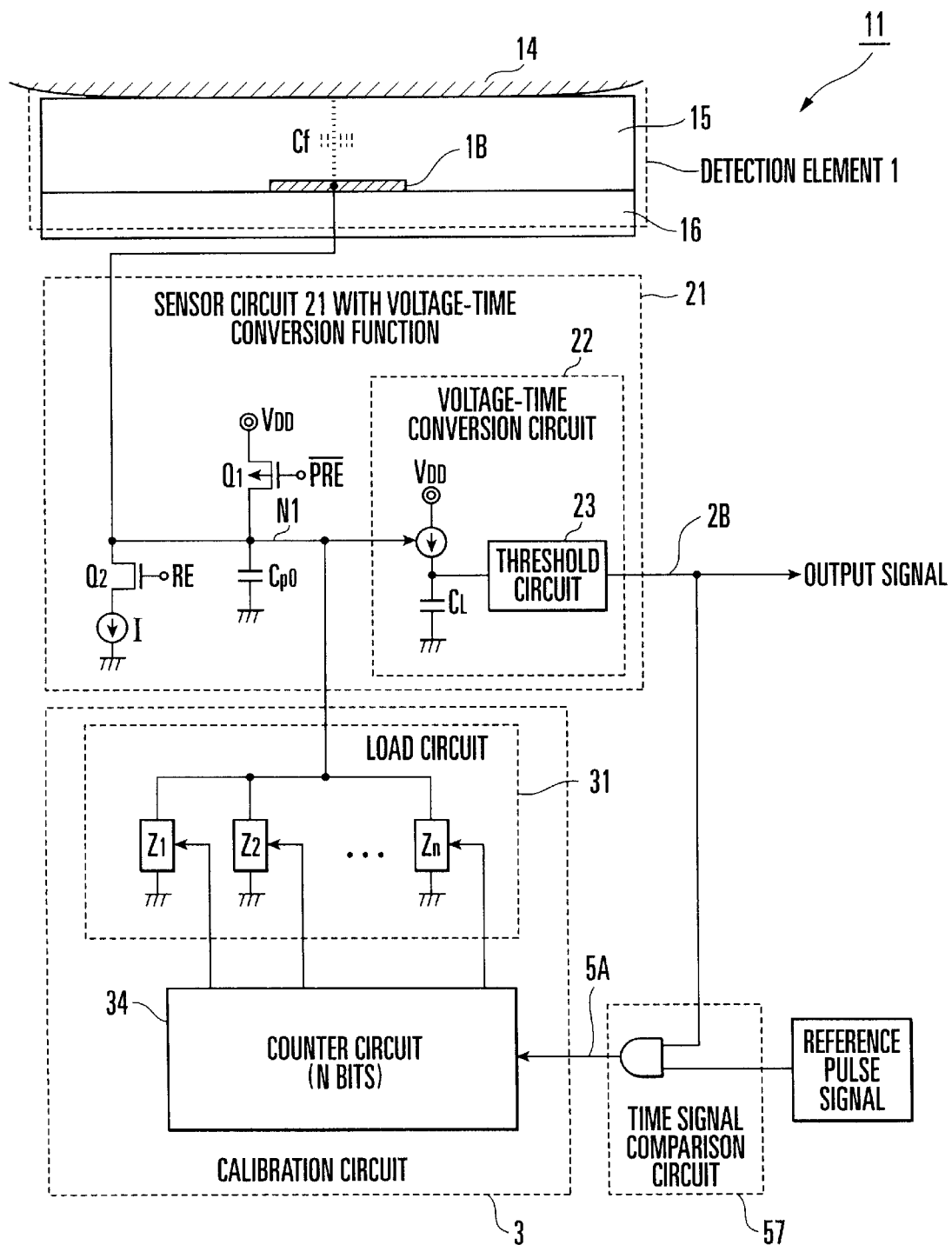
FIG. 21 is a block diagram showing the detailed example of the seventh embodiment shown in FIG. 20.

FIG. 21 shows the detailed example of the sensor cell having the sensor circuit with voltage-time conversion function. The calibration circuit 3 is the same as that using a counter circuit 34 shown in FIG. 16. In the sensor circuit 21 with voltage-time conversion function, a voltage-time conversion circuit 22 is arranged in place of the Nch MOSFET $Q_3$ and resistor R, unlike the above-described sensor circuit 2 shown in FIG. 34.

A general-purpose circuit may be used as the voltage-time conversion circuit 22. Alternatively, the voltage-time conversion circuit 22 may be formed from a constant current circuit, capacitive element $C_L$ and threshold circuit 23, as shown in FIG. 21 (e.g., Japanese Patent Application No. 11-157755).

The operation principle of the calibration circuit when the sensor circuit 21 with voltage-time conversion function is used will be briefly described using FIGS. 22A to 22C.

The time signal comparison circuit 57 is typically formed from an AND circuit which ANDs the sensor cell output 2B and the reference pulse signal from the reference pulse signal generation circuit and sends the result to the counter circuit 34 as the output.

The value of the counter circuit 34 is set in advance to an initial set value that controls all load elements $Z_1$ to $Z_N$ to the inactive state. The output signal 2B of the sensor circuit 21 with voltage-time conversion function is also set to an initial set value. In the first sense operation, when the output signal 2B changes before a predetermined timing (e.g., when the sense operation is performed without placing a finger 13, and the output signal from the sensor cell changes during the sense time), the counter circuit 34 is incremented by one on the basis of the output from the time signal comparison circuit 57. As a result, the data in the counter circuit 34 changes to activate one load element. The output signal 2B from the sensor circuit 21 with voltage-time conversion function is returned to the initial set value.

When the output signal changes before the predetermined timing (e.g., when the sense operation is performed without placing the finger 13, and the output signal from the sensor cell changes during the sense time) even in the second sense operation, the counter circuit 34 is further incremented by one. If the value of the load element is sequentially doubled in accordance with the digit of the counter, the twice number of load elements are consequently activated. For example, if $Z_1=Z$, $Z_2=2Z$, $Z_3=4Z$, ..., $Z_N=2^{(N-1)}Z$ are set, and the load elements $Z_1$ to $Z_N$ are sequentially controlled from the lower bit of the counter circuit 34, the value of the load element connected to the sensor circuit 21 increases by Z for every increment.

Such operation is repeated until the output signal from the sensor circuit 21 with voltage-time conversion function does not change during a predetermined time (e.g., when the sense operation is performed without placing the finger 13, and until the output signal from the sensor cell does not change during the sense time). If the output signal does not change during the predetermined time, the counter circuit 34 is not incremented, and no more load elements are connected to the sensor circuit 21.

When voltage-time conversion is preformed, no DC current flows to the output level correction system including calibration, and therefore, the power consumption of the entire apparatus can be reduced as compared to the other embodiments.

As described above, when the calibration circuit 3 is added to the sensor circuit 2, and an appropriate number of load elements in the calibration circuit 3 are connected to the sensor circuit 2, the variation in performance between the sensor cells due to the process variation is eliminated, and consequently, the performance of the sensor cells can be uniformed.

As described above, in the small shape recognizing capacitive sensor device of the present invention, since the calibration circuit is incorporated in the sensor cell, the detection sensitivity of the sensor cell can be adjusted using the calibration circuit. Hence, when the sensor of the present invention is applied to the small shape recognizing capacitive sensor device, the detection sensitivities of the plurality of sensor circuits can be individually adjusted. The variation in performance between the sensor cells due to the process variation can be eliminated, and consequently, the performance of the sensor cells can be uniformed. As a result, any degradation in image quality by noise in the detected image due to a variation in sensitivity between the sensor circuits can be prevented, and the manufacturing yield of devices can also be improved as compared to the prior art.

In addition, the variation in detection performance between the sensors due to a variation between chips or a variation between wafers can be eliminated. This improves the yield of sensor chips and reduces the manufacturing cost. This is very effective especially for supply of inexpensive sensor chips. Even when the surface of the sensor having satisfactory detection performance changes due to the use state, calibration can be executed at the time of use, and the degradation in detection performance can be prevented. This prolongs the performance guarantee period and service life of the module having the sensor, or in a system using the sensor, the exchange frequency of the sensor component can be reduced. As a result, the cost for coping with returned products or system maintenance can be reduced.

(Eighth Embodiment)

Figure 23:
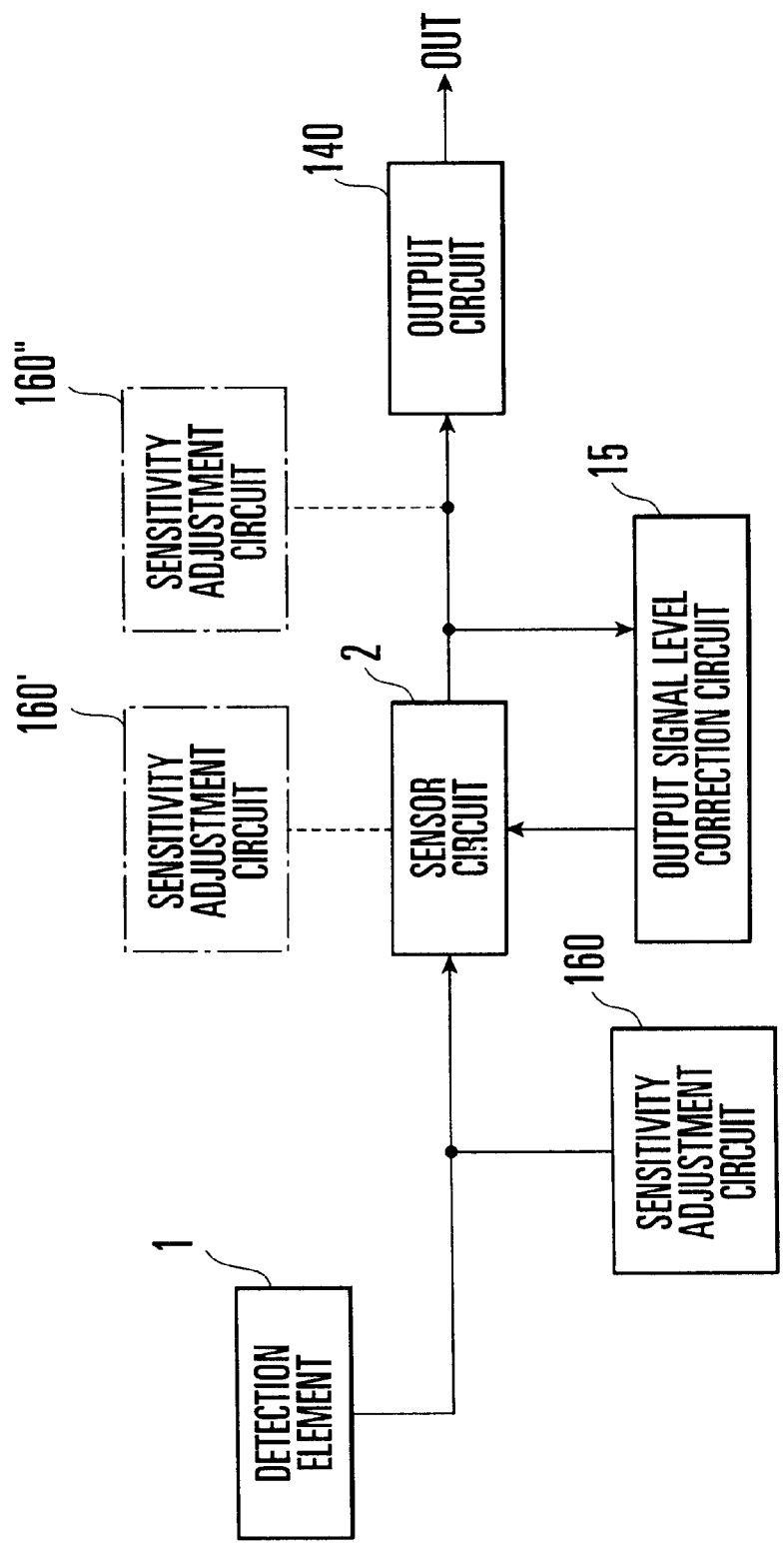
FIG. 23 is a block diagram showing the eighth embodiment of the present invention.

FIG. 23 shows the eighth embodiment of the present invention, which is different from the above-described embodiments in that a sensitivity adjustment circuit 160 is added.

The sensitivity adjustment circuit 160 provided for each sensor cell is important. The sensitivity adjustment circuit 160 is generally arranged on an input side 2 (160) of a sensor circuit. However, the sensitivity adjustment circuit 160 may be incorporated in the sensor circuit 2 (161') or on the output side (160") of the sensor circuit 2.

This arrangement can improve the manufacturing yield of the small shape recognizing capacitive sensor device and reduce the manufacturing cost. Especially, this is very effective in supplying a large quantity of inexpensive sensor devices.

(Ninth Embodiment)

Figure 24:
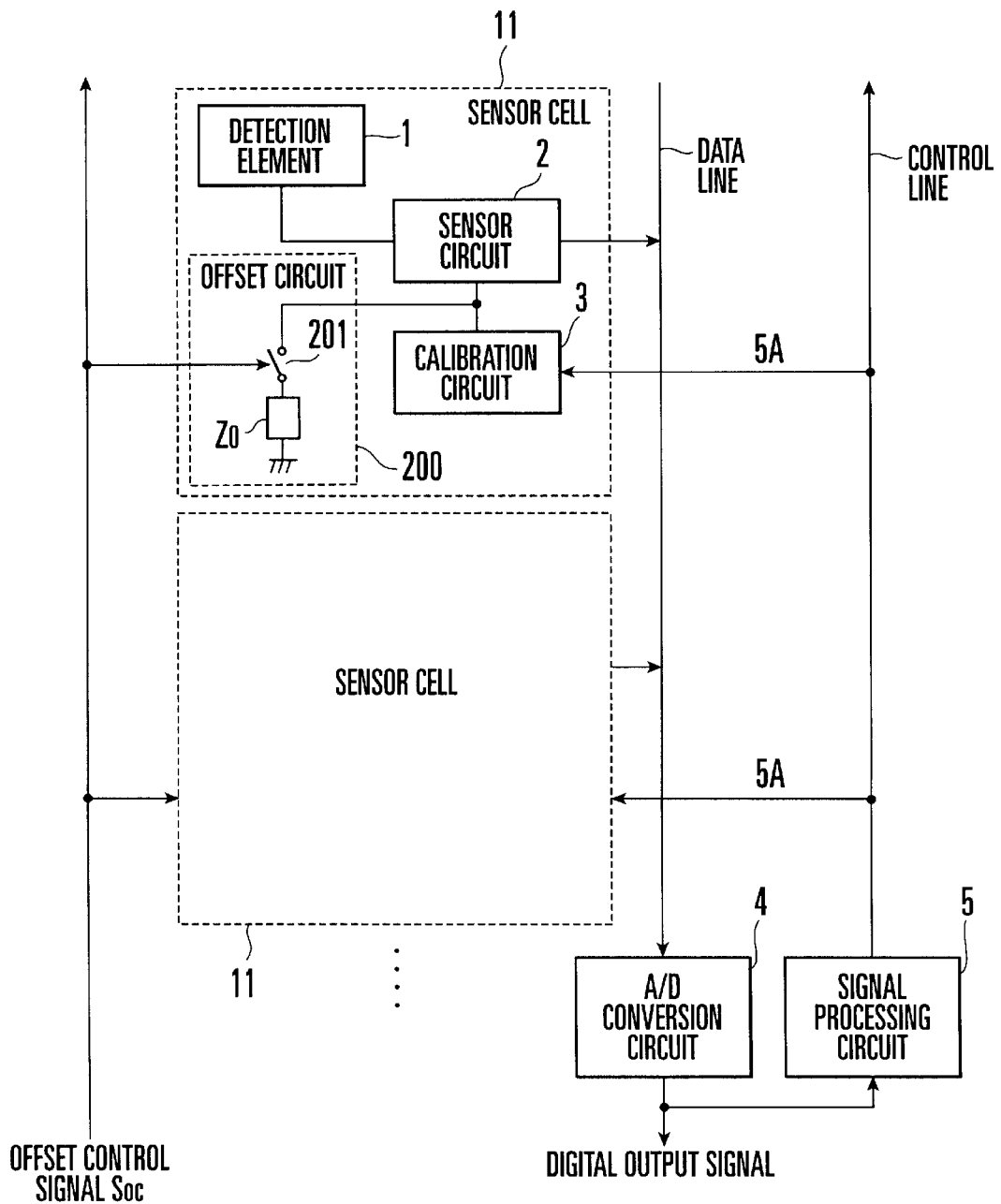
FIG. 24 is a block diagram showing the ninth embodiment of the present invention.

FIG. 24 shows the ninth embodiment as a modification to FIG. 3. FIG. 24 is different from FIG. 3 in that each sensor cell 11 incorporates an offset circuit 200, and the offset circuit 200 is controlled by an offset control signal $S_{OC}$.

The offset circuit 200 is formed from a load circuit. The load circuit (to be referred to an offset load circuit hereinafter) for implementing the offset circuit is constituted by a switch 201 ON/OFF-controlled by the offset control signal $S_{OC}$ and an offset load element $Z_O$. Connection of the load $Z_O$ to a sensor circuit 2 is controlled by ON/OFF-controlling the switch 201 by the offset control signal $S_{OC}$.

The switch 201 is formed from, e.g. a MOSFET as shown in FIG. 6, as in the above-described embodiments. The offset load element $Z_O$ is formed from a capacitive element as shown in FIG. 7A or 7B.

When such an offset circuit 200 is provided independently of a calibration circuit 3, the number of load elements can be increased without increasing the number of components (e.g., memory circuits) in the calibration circuit 3. Hence, the sensitivity adjustment accuracy for the sensor circuit can be improved by adding the offset load element $Z_O$ without increasing the scale of the calibration circuit 3.

Since each of the arrangements shown in FIGS. 24 to 29 incorporates an offset circuit, the adjustment accuracy for the characteristic of the sensor circuit can be improved while suppressing any increase in circuit scale. In addition, when the number of load elements controlled by the memory circuit in the calibration circuit is decreased by the same number as that of load elements in the offset circuit, the memory circuit scale can be reduced while keeping the adjustment accuracy unchanged.

Hence, according to the small shape recognizing capacitive sensor device of the present invention, the number of load elements for adjusting the characteristic of the sensor circuit can be increased in the sensor cell that is as small as about 50-$\mu$m square without high integration using microfabrication. For this reason, the adjustment accuracy for the characteristic of the sensor circuit can be improved while suppressing any increase in manufacturing cost due to use of microfabrication. When the number of sensor circuits is kept unchanged, the memory circuit scale can be reduced. Hence, the manufacturing yield can be improved, and the manufacturing cost can be reduced.

(10th Embodiment)

Figure 25:
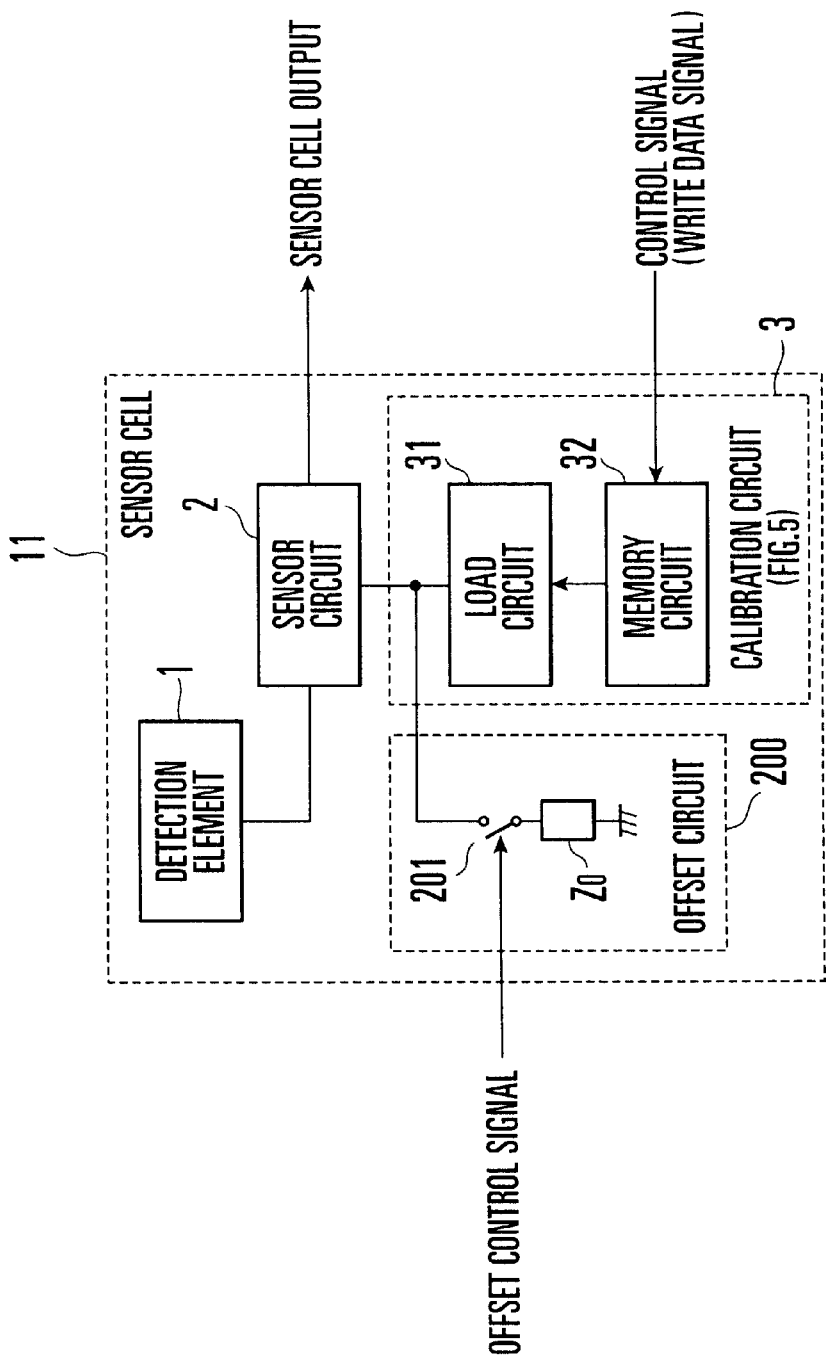
FIG. 25 is a block diagram showing the 10th embodiment of the present invention.

The 10th embodiment shown in FIG. 25 is a modification to the embodiment shown in FIG. 24, in which an offset circuit 200 is used, and a calibration circuit 3 is formed from a load circuit 31 and memory circuit 32, as in FIG. 5.

With this arrangement, when an offset load element $Z_O$ is added, and one of load elements $Z_1$ to $Z_N$ in the calibration circuit 3 is omitted, the memory circuit scale in the calibration circuit can be reduced by one bit while keeping the accuracy of sensitivity adjustment for the sensor circuit unchanged. In this case, since the circuit scale is reduced, the yield of small shape recognizing capacitive sensor devices can also be improved.

(11th Embodiment)

Figure 26:
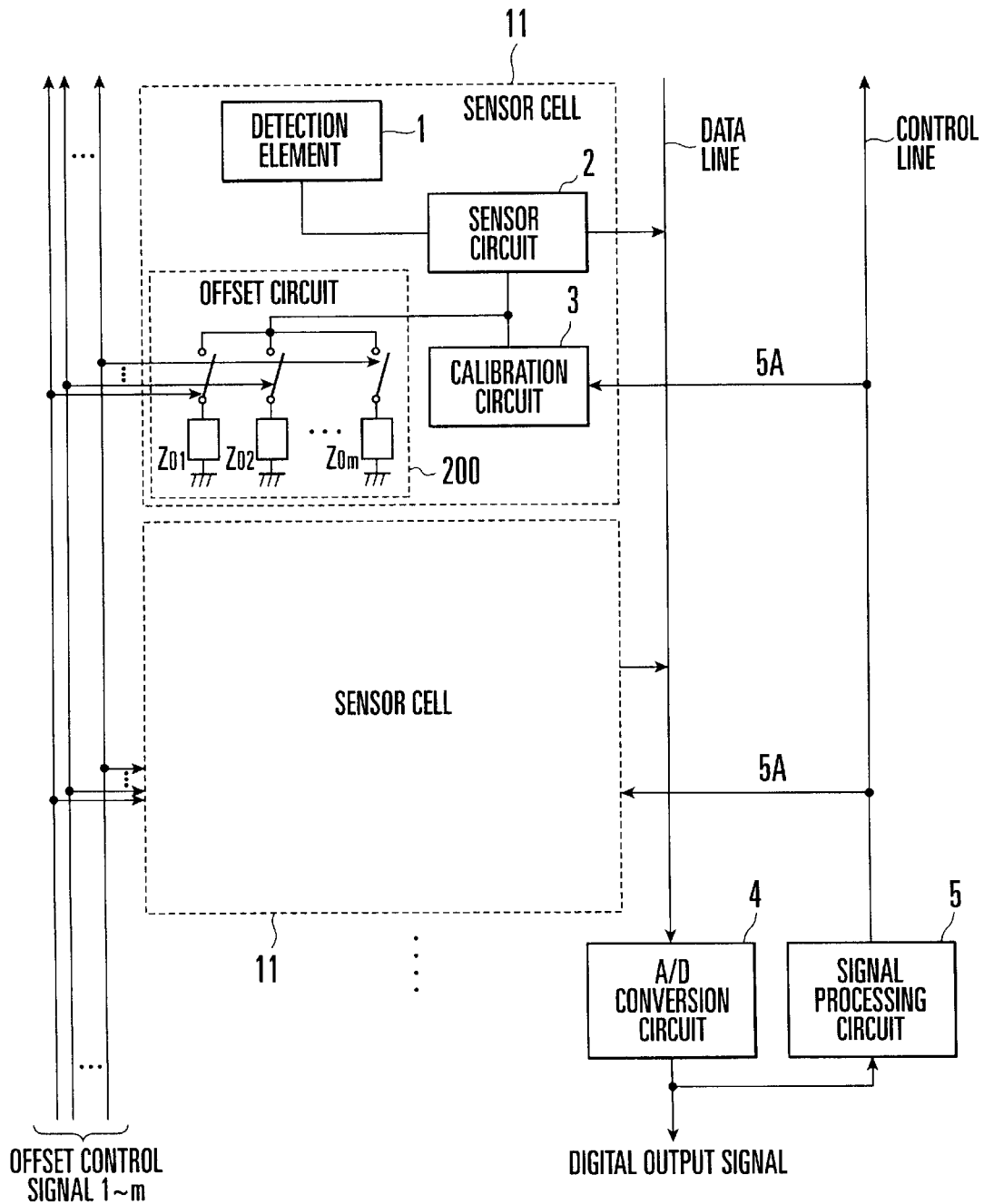
FIG. 26 is a block diagram showing the 11th embodiment of the present invention.

FIG. 26 shows the 11th embodiment of the present invention as a modification to FIG. 24. In place of the offset control signal $S_{OC}$, a plurality of offset control signals 1 to m are input. In this case, m is a natural number of 2 or more.

An offset load circuit which constitutes an offset circuit 200 is controlled by the plurality of offset control signals 1 to m. The offset circuit 200 is formed from series connection structures of offset load elements $Z_{o1}$ and $Z_{o2}$ to $Z_{om}$ controlled by the offset control signals 1 to m and switch elements $201_1$ to $201_m$. This embodiment is different from the 11th embodiment in that the load circuit of the sensor cell incorporates m offset load elements.

The offset load elements $Z_{o1}$ and $Z_{o2}$ to $Z_{om}$ are controlled by the offset control signals 1 to m. That is, the number of load elements can be increased by m without increasing the scale of the memory circuit in the calibration circuit. Hence, the sensitivity adjustment accuracy for the sensor circuit can be improved by adding the offset load elements $Z_{o1}$ and $Z_{o2}$ to $Z_{om}$ without increasing the scale of the memory circuit. When the offset load elements $Z_{o1}$ and $Z_{o2}$ to $Z_{om}$ are added, and m load elements of load elements $Z_1$ to $Z_N$ in the calibration circuit are omitted, the memory circuit scale in the calibration circuit can be reduced by m bits while keeping the accuracy of sensitivity adjustment for the sensor circuit unchanged. In this case, since the circuit scale is reduced, the yield of small shape recognizing capacitive sensor devices can also be improved.

(12th Embodiment)

Figure 27:
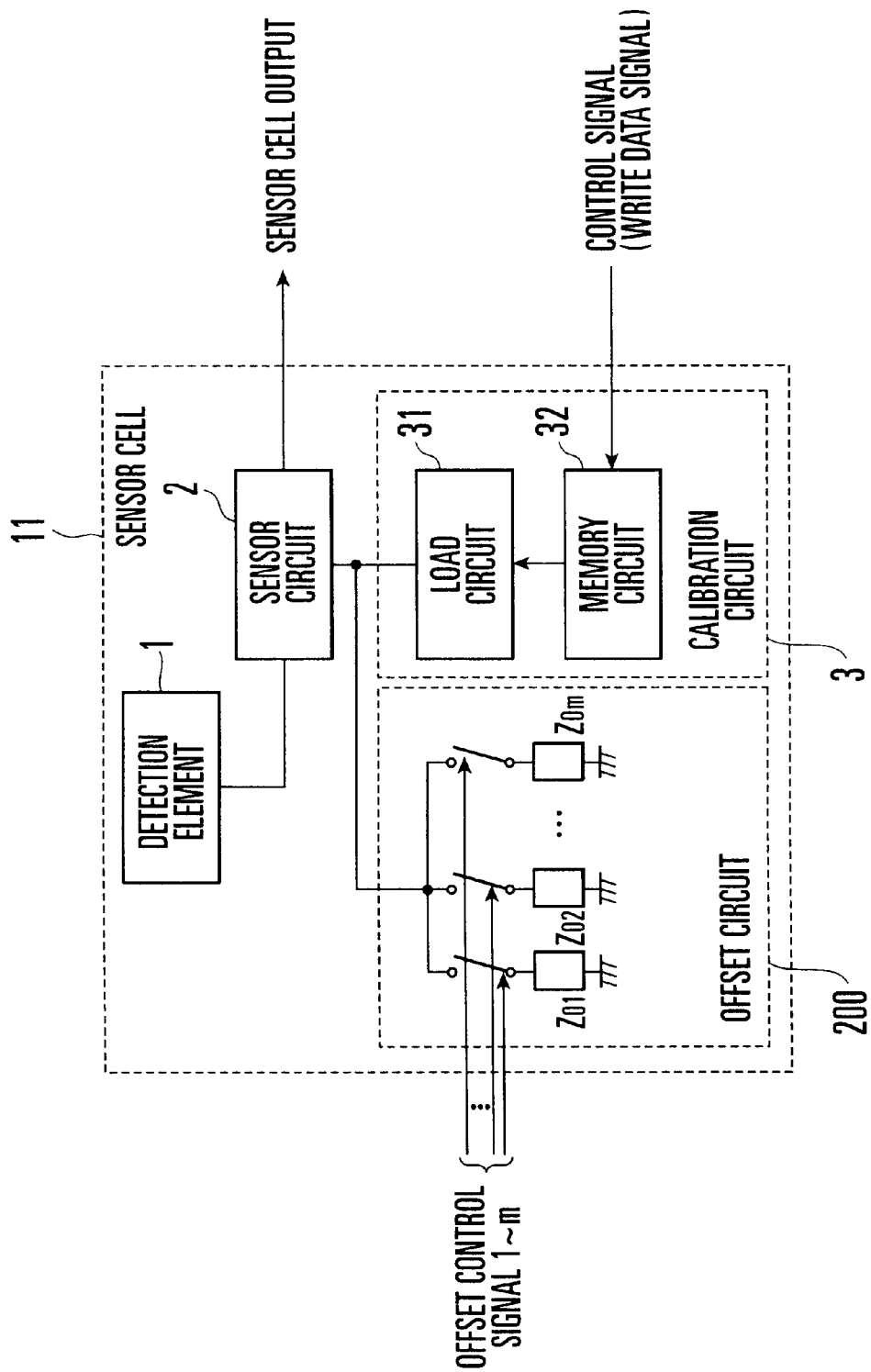
FIG. 27 is a block diagram showing the 12th embodiment of the present invention.

FIG. 27 shows a modification to the 11th embodiment. A calibration circuit 3 is formed from a load circuit 31 and memory circuit 32, as in FIG. 25. With this arrangement, the effects of the 10th and 11th embodiments can be obtained.

(13th Embodiment)

Figure 28:
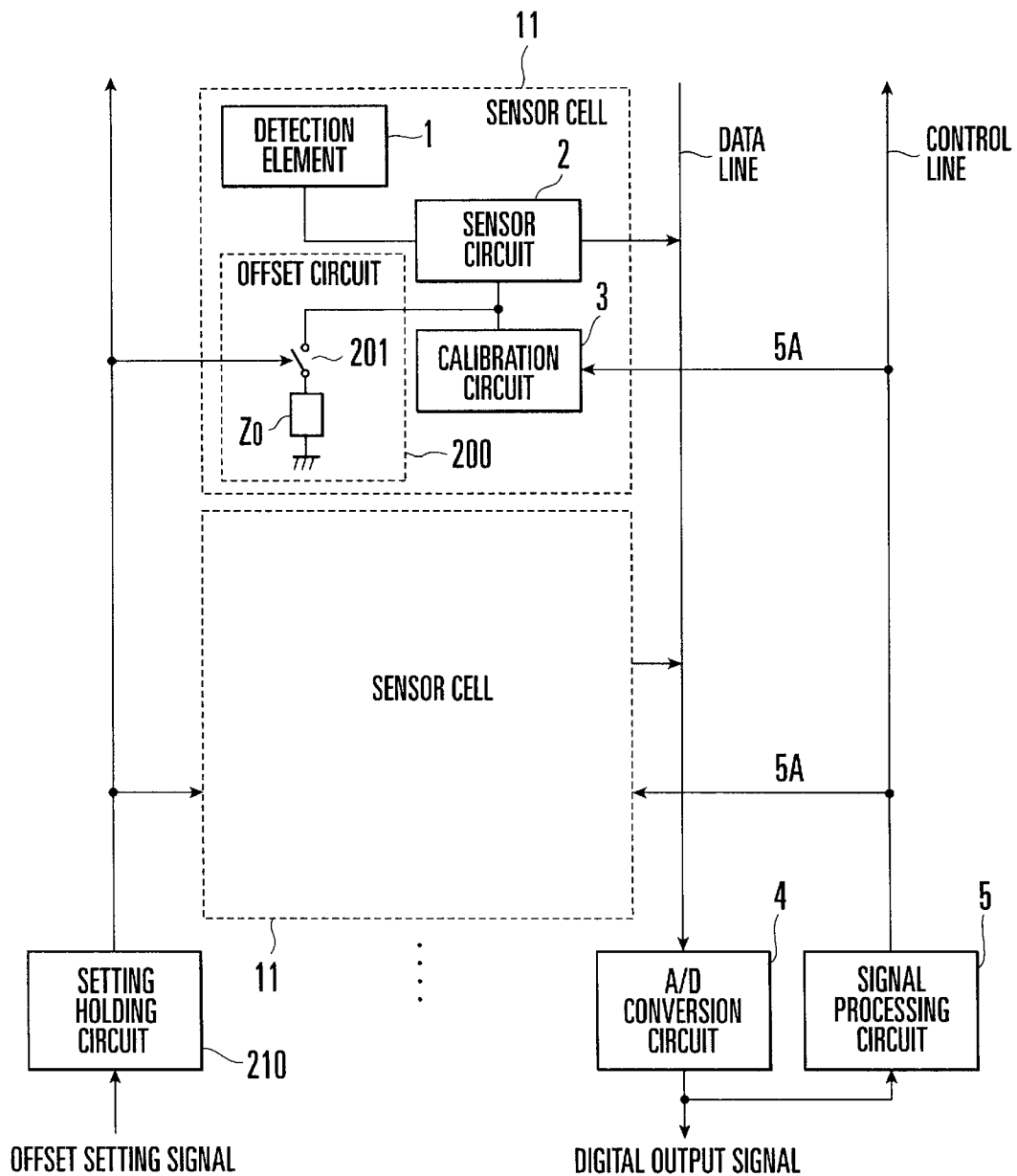
FIG. 28 is a block diagram showing the 13th embodiment of the present invention.

FIG. 28 shows a modification to the ninth embodiment shown in FIG. 24. FIG. 28 is different from FIG. 24 in that the device has a setting holding circuit 210 for holding the set value of the offset control signal. When the setting holding circuit 210 holds the value of the offset control signal, the value of the offset control signal need not always be held.

(14th Embodiment)

Figure 29:
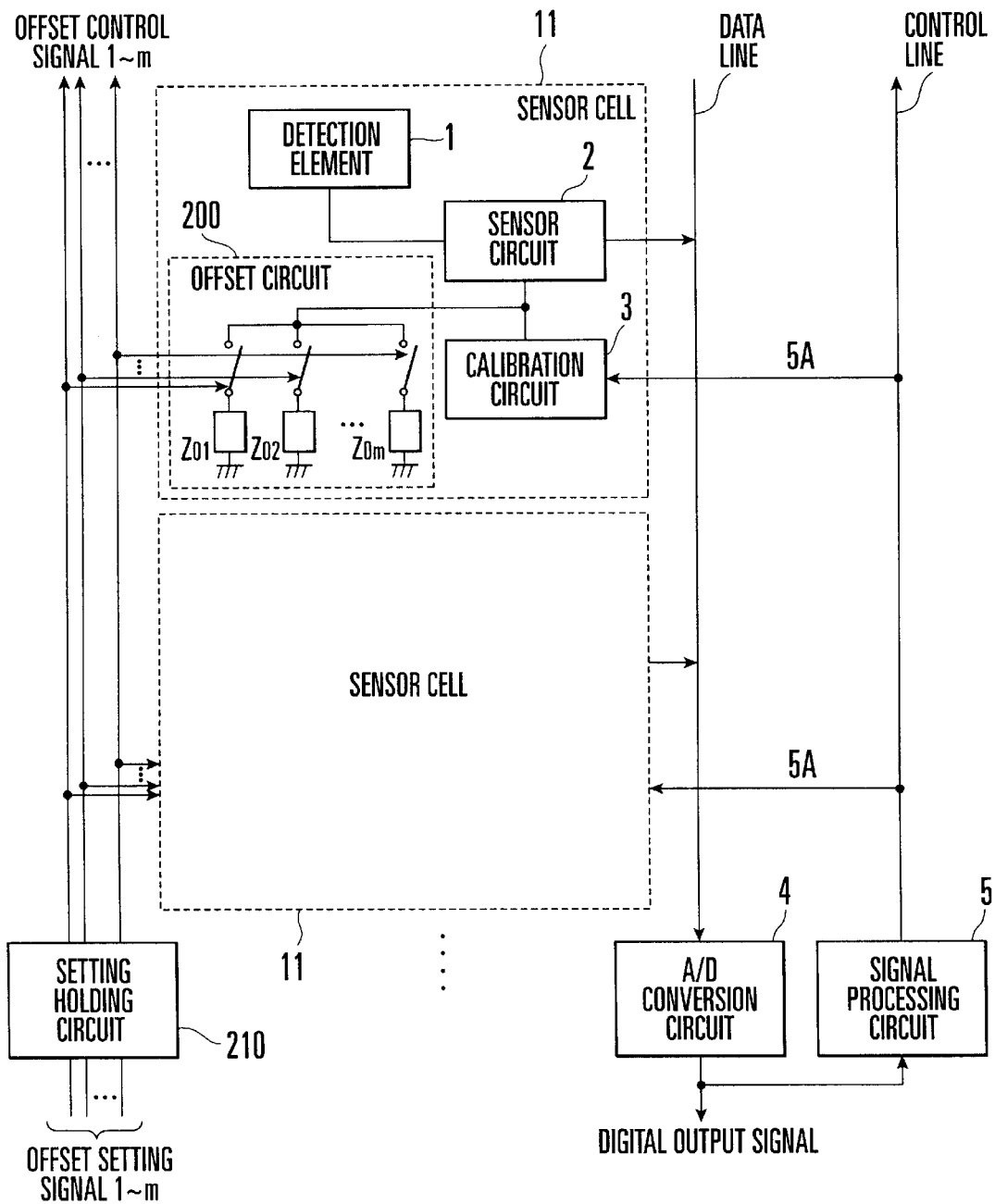
FIG. 29 is a block diagram showing the 14th embodiment of the present invention.

Referring to FIG. 29, a plurality of offset control signals are used, unlike the 13th embodiment. Hence, a setting holding circuit 210 has a holding function of individually holding offset control signals 1 to m. The effect is the same as in the embodiment shown in FIG. 28.

(15th Embodiment)

Figure 22:
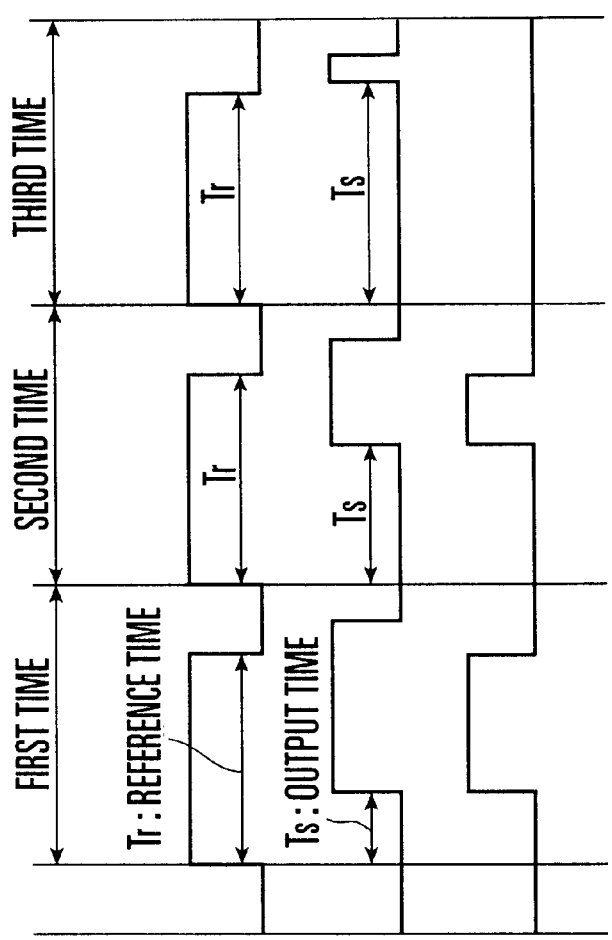
FIGS. 22A to 22C are waveform charts for explaining the detailed operation in FIG. 21.
Figure 30:
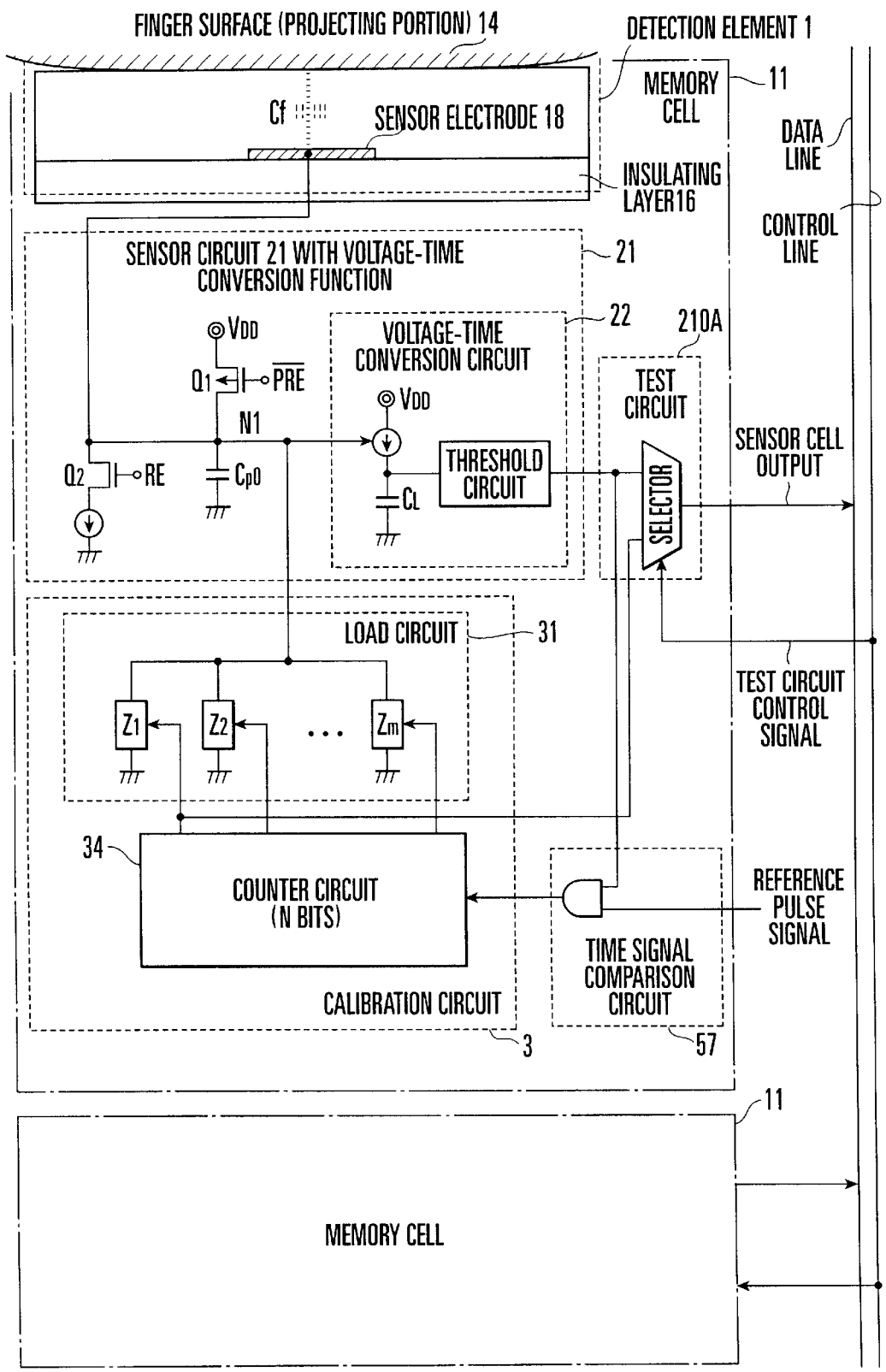
FIG. 30 is a block diagram showing the 15th embodiment of the present invention.

FIG. 30 shows the 15th embodiment of the present invention as a modification to the arrangements shown in FIGS. 20 to 22. In a small shape recognizing capacitive sensor device of this embodiment, a test circuit 210A is added to a sensor cell 11 shown in FIGS. 20 and 21 described above. The calibration circuit is inspected using the test circuit 210A.

Referring to FIG. 30, the test circuit 210A is formed from a selector. The selector is controlled by a test circuit control signal.

In normal operation, the test circuit 210A, i.e., selector outputs the signal from a sensor circuit 21 as the output signal from the sensor cell 11. In inspecting a calibration circuit 3, the selector 210A outputs the most significant bit signal of a memory circuit 34 (n-bit counter) of the calibration circuit 3 as the output signal from the sensor cell 11.

In the inspection mode, first, it is confirmed through a data line $L_D$ that the most significant bit of the memory circuit 34 (n-bit counter) outputs "0". Calibration operation is performed, and the counter is incremented until the most significant bit of the memory circuit 34 (n-bit counter) becomes "1". It is confirmed through the data line $L_D$ that the most significant bit of the memory circuit 34 (n-bit counter) outputs "1".

As is understood from the above description, it can be inspected whether the memory circuit 34 (n-bit counter) in the calibration circuit 3 is normally operating.

(16th Embodiment)

Figure 31:
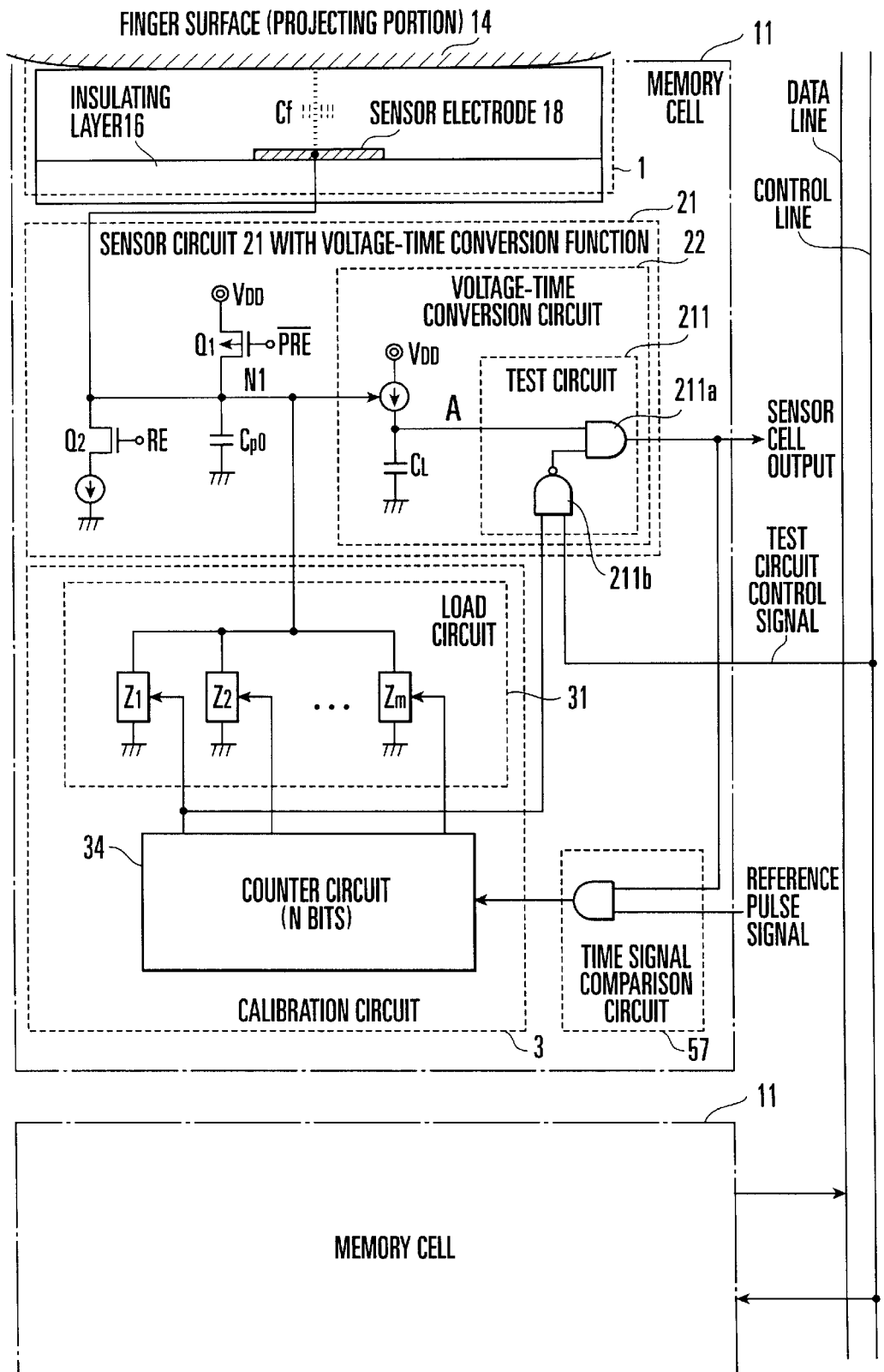
FIG. 31 is a block diagram showing the 16th embodiment of the present invention.

FIG. 31 shows a modification to FIG. 30, in which a sensor circuit 2 with voltage-time conversion function incorporates a test circuit 211, and a test circuit control signal is input to the test circuit 211. The remaining elements are the same as in FIG. 30, and a detailed description thereof will be omitted.

Referring to FIG. 31, the test circuit 211 is constituted by a threshold circuit with test circuit. This test circuit 211 is formed from an AND circuit 211a and NAND circuit 211b and controlled by a test circuit control signal.

Referring to FIG. 31, a sensor output A is supplied to one input terminal of the AND circuit 211a of the test circuit 211. The test circuit control signal and the most significant bit of a memory circuit 34 are input to the NAND circuit 211b. The output from the NAND circuit 211b is supplied to the other input terminal of the AND circuit 211a.

When the test circuit control signal is at high level, and the output value of the memory circuit 34 (n-bit counter) is "0", the test circuit 211 outputs the sensor output A. When the output value of the memory circuit 34 (n-bit counter) is "1", the output from the test circuit 211 is fixed at low level.

When the test circuit control signal is at low level, in the normal operation, the test circuit 211 outputs the signal from the sensor circuit 2 as the output signal from the sensor cell 11. In inspecting a calibration circuit 3, the test circuit 211 performs the above-described operation by the most significant bit signal of the memory circuit 34 (n-bit counter) in the calibration circuit 3. That is, it is confirmed through a data line $L_D$ that when the most significant bit of the n-bit counter of the memory circuit 34 outputs "0", the signal in the sensor cell is output. The signal in the sensor cell is always changed from low level to high level by a voltage-time conversion circuit 22. This is confirmed through the data line $L_D$.

In addition, calibration operation is performed, and the counter is incremented until the most significant bit of the n-bit counter of the memory circuit 34 becomes "1". It is confirmed through the data line $L_D$ that when the most significant bit of the n-bit counter of the memory circuit 34 outputs "1", the signal is fixed at low level. It can be inspected that the n-bit counter in the calibration circuit is normally operating by confirming whether the signal through the data line changes or is fixed at low level.

As described above in the embodiments in shown in FIGS. 30 and 31, in the small shape recognizing capacitive sensor device of the present invention, since the sensor cell incorporates a test circuit, malfunction of the calibration circuit itself can be detected. Hence, with the arrangements of the embodiments, the calibration circuit in the sensor cell can be inspected before assembly, and the assembly cost can be reduced by assembling only non-defective chips.

(17th Embodiment)

Figure 32:
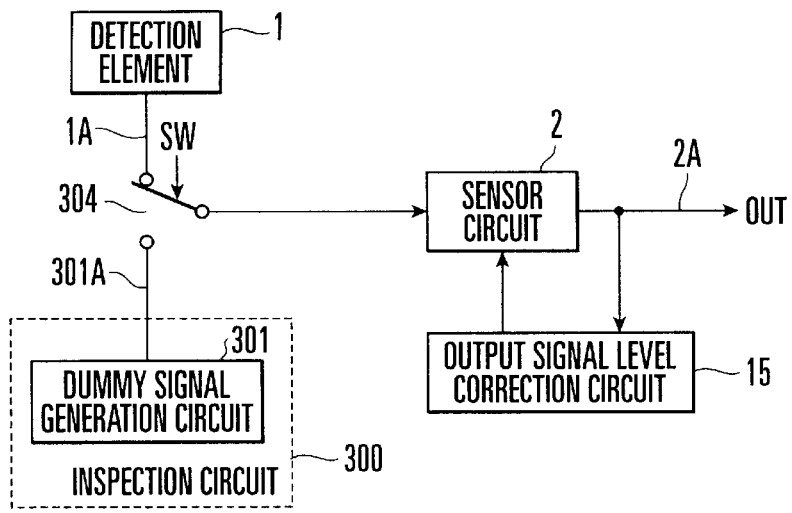
FIG. 32 is a block diagram showing the 17th embodiment of the present invention.

FIG. 32 shows the 17th embodiment of the present invention. This small shape recognizing capacitive sensor device is formed from a number of sensor cells 11 arranged in a two-dimensional layout (array or matrix), as in the above-described embodiments.

Referring to FIG. 32, each sensor cell 11 has a detection element 1 and sensor circuit, and additionally, an inspection circuit 300. In this case, the above-described output level correction circuit 15 is irrelevant to this embodiment and is not illustrated.

The inspection circuit 300 outputs, to a sensor circuit 2 through a switch 304, a dummy signal 301A equivalent to a detection signal 1A from the detection element 1. The operation of the sensor cell 11 will be briefly described. In testing a stand-alone small shape recognizing capacitive sensor device before the small shape recognizing capacitive sensor device is assembled into, e.g., a surface shape recognition device, the sensor circuit 2 is operated using the inspection circuit 300 to execute performance test before assembly. In normal use, the inspection circuit 300 is set in the inactive state, and a surface shape is detected using the detection element.

A switching control signal SW is a signal for controlling the switch 304. The inspection circuit 300 is formed from a dummy signal generation circuit 301. The dummy signal generation circuit 301 is a circuit for simulating a detection signal 1A detected from the detection element 1.

In the test mode, the inspection circuit 300 and sensor circuit 2 are connected by the switch 304, and the performance is evaluated. Normally, the switch connects the detection element 1 and sensor circuit 2, and the inspection circuit 300 is disconnected from the sensor circuit 2. The switch 304 can be implemented by a transistor such as a MOSFET which can be ON/OFF-controlled by the signal SW.

The dummy signal generation circuit 301 is implemented by a circuit for simulating and outputting a signal equivalent to that from the detection element 1 in accordance with the detection signal (capacitance value, resistance value, voltage value, or current value) detected by the detection element 1. As in the above-described embodiments, when the surface shape of the object to the recognized is detected by the detection element 1 as a change in capacitance value, a capacitive element is used as the dummy signal generation circuit 301. This can be implemented by a PIP capacitance or MIM capacitance.

(18th Embodiment)

Figure 33:
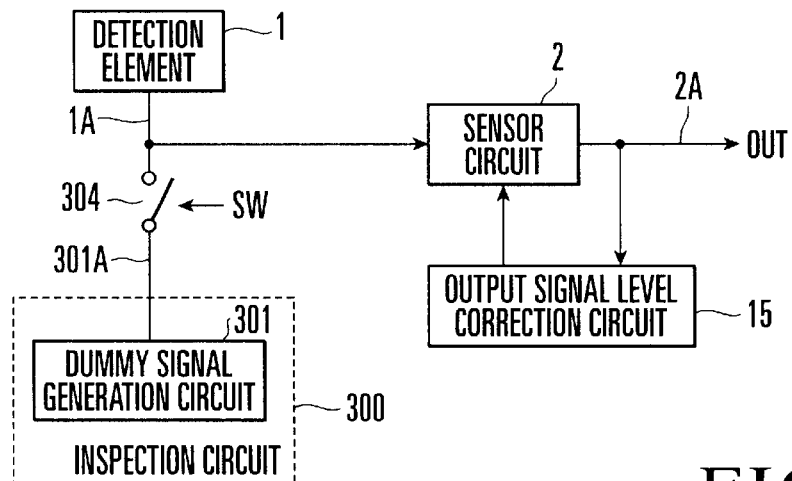
FIG. 33 is a block diagram showing the 18th embodiment of the present invention.

FIG. 33 shows the 18th embodiment which uses an inspection circuit 300. As in the embodiment shown in FIG. 32, the device is constituted by a detection element 1, inspection circuit 300, sensor circuit 2, and switch 304.

A signal SW controls the switch 304. The inspection circuit 300 is formed from a dummy signal generation circuit 301. This dummy signal generation circuit 301 is a circuit for simulating a detection signal 1A detected from the detection element 1. The 18th embodiment is different from the 17th embodiment shown in FIG. 32 in the connection relationship of the switch 304.

In the test mode, the switch 304 is turned on to connect the inspection circuit 300, detection element 1, and sensor circuit 2, and the performance is evaluated. Normally, the switch 304 is turned off to disconnect the inspection circuit 300 from the sensor circuit 2. Since the switch 304 is connected in the above way, and both the detection element 1 and inspection circuit 300 are connected to the sensor circuit 2 in the test mode, the performance of the sensor circuit 2 can be evaluated in consideration of the parasitic effect of the detection element 1. For example, when the detection element 1 is a capacitive element, a parasitic capacitance is also formed in fact, and the operation performance of the sensor circuit 2 can be evaluated while taking the parasitic capacitance into consideration. Hence, the evaluation can be performed at higher accuracy than in the 17th embodiment shown in FIG. 32.

(19th Embodiment)

Figure 34:
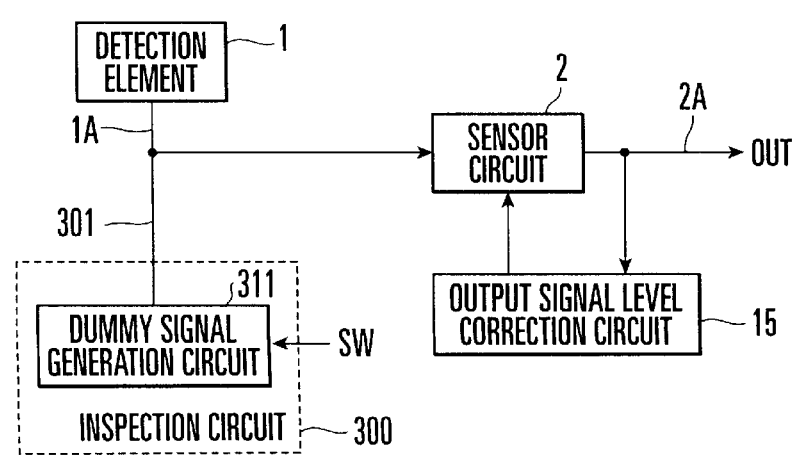
FIG. 34 is a block diagram showing the 19th embodiment of the present invention.

FIG. 34 shows the 19th embodiment of the present invention. The device is constructed by a detection element 1, inspection circuit 300, and sensor circuit 2, as in the above-described 17th and 18th embodiments.

The inspection circuit 300 is formed from a dummy signal generation circuit 311 controllable to an active state. The dummy signal generation circuit 311 is controlled to the active or inactive state by a signal SW. The dummy signal generation circuit 311 is a circuit for simulating a detection signal 1A detected from the detection element.

The 19th embodiment is different from the 18th embodiment shown in FIG. 33 in the switch 304 is not omitted. In the test mode, the dummy signal generation circuit 311 is activated to connect the inspection circuit 300, detection element 1, and sensor circuit 2, and the performance is evaluated. Normally, the dummy signal generation circuit 311 is inactivated to disconnect the inspection circuit 300 from the sensor circuit 2.

With this arrangement, the parasitic capacitance or parasitic resistance of the switch 304 can be prevented from being connected to the sensor circuit 2. That is, since the parasitic capacitance or parasitic resistance of the switch 304 is not connected to the sensor circuit 2 in the test mode, the performance of the sensor circuit 2 can be evaluated in the same state as in the normal state.

Hence, the evaluation can be performed at higher accuracy than in the 18th embodiment shown in FIG. 33.

Figure 35:
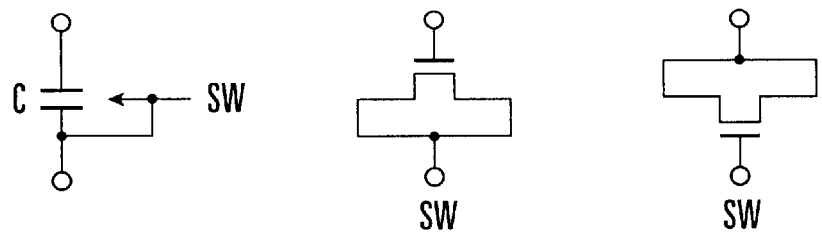
FIG. 35 is a view showing detailed examples of a dummy signal generation circuit shown in FIG. 34, which can be controlled to an active state.

FIG. 35 shows the implementation example of the dummy signal generation circuit 311 controllable to the active state, which is used in the embodiment shown in FIG. 34. The dummy signal generation circuit 311 is implemented by a circuit for simulating a signal equivalent to that from the detection element 1 in accordance with the detection signal 1A (capacitance value, resistance value, voltage value, or current value) detected by the detection element 1. When a capacitive element is used, the gate terminal or the source and drain terminals of the MOS capacitance can be controlled by the signal SW.

(20th Embodiment)

In the 20th embodiment of the present invention, an inspection circuit 300 of the 17th embodiment is constructed by two or more dummy signal generation circuits. The illustration can easily be assumed and therefore will be omitted. Unlike the 17th embodiment, since the inspection circuit 300 is formed from two or more dummy signal generation circuits, a plurality of dummy signals can be generated, and a more accurate test can be performed.

(21st Embodiment)

In the 21st embodiment of the present invention, an inspection circuit 300 of the 18th embodiment shown in FIG. 33 is constructed by two or more dummy signal generation circuits. The illustration can easily be assumed and therefore will be omitted. Unlike the 18th embodiment shown in FIG. 33, since the inspection circuit 300 is formed from two or more dummy signal generation circuits, a plurality of dummy signals can be generated, and a more accurate test can be performed.

(22nd Embodiment)

In the 22nd embodiment of the present invention, an inspection circuit 300 of the 19th embodiment shown in FIG. 34 is constructed by two or more dummy signal generation circuits. The illustration can easily be assumed and therefore will be omitted. Unlike the 19th embodiment shown in FIG. 34, since the inspection circuit 300 is formed from two or more dummy signal generation circuits, a plurality of dummy signals can be generated, and a more accurate test can be performed.

According to the 17th to 22nd embodiments shown in FIGS. 32 to 34, since the inspection circuit is used, and an electric change amount for inspection is supplied to the sensor circuit as needed, the performance of the sensor circuit can be tested using the inspection circuit before assembly. Hence, when the sensor of the present invention is applied to the small shape recognizing capacitive sensor device, a surface shape recognizing sensor device with an operation error can be discriminated before assembly, and the assembly cost can be reduced. In addition, since the test time after assembly can be reduced, the test cost can also be reduced. Furthermore, the production throughput can also be improved. Especially, when the technique of the present invention is applied to a surface shape recognizing sensor device which must be mass-produced at low cost, the cost reduction and improvement of production throughput can effectively be realized.

What is claimed is:

1. A small shape recognizing capacitive sensor device comprising:

a number of detection elements arranged adjacent to each other;

a number of sensor circuits connected to said detection elements, respectively; and a correction circuit for correcting an output signal level of said sensor circuit, said output signal level correction circuit comprising
  a calibration circuit connected to an output side of said sensor circuit,
  a calibration reference signal generation circuit for generating a calibration reference signal, and
  a comparison circuit for comparing an output from said sensor circuit with the calibration reference signal and supplying a difference output to said calibration circuit as a control signal,
  wherein said calibration circuit corrects a level of a sensor circuit output on the basis of the control signal such that the difference between the output from said sensor circuit and the calibration reference signal becomes zero, and wherein
    said sensor circuit comprises a sensor circuit with voltage-time conversion function for converting an output signal corresponding to an electric charge amount from said corresponding detection element into a signal which changes in a direction of time axis, and
    said comparison circuit compares a voltage-time conversion signal as the output from said sensor circuit with the calibration reference signal and outputs a difference signal to said calibration circuit as the control signal.

2. A device according to claim 1, further comprising a conversion circuit for converting the output from said sensor circuit into a digital output signal through a common data line.

3. A device according to claim 1, wherein said calibration circuit comprises
  a load circuit having at least one load element connected to said sensor circuit and
  a memory circuit for executing connection control for the load element to said sensor circuit on the basis of stored contents updated by the control signal.

4. A device according to claim 1, wherein said calibration circuit comprises
  a load circuit having at least one load element connected to said sensor circuit, and
  a shift register for executing connection control for the load element to said sensor circuit on the basis of stored contents updated by the control signal.

5. A device according to claim 1, wherein said calibration circuit comprises
  a load circuit having at least one load element connected to said sensor circuit, and
  a counter circuit for executing connection control for the load element to said sensor circuit on the basis of stored contents updated by the control signal.

6. A device according to claim 1, wherein said calibration circuit comprises a load circuit, said load circuit having a switch for selectively connecting a plurality of load elements to said sensor circuit on the basis of stored contents of storage capacitances equal in number to the load elements.

7. A device according to claim 6, wherein said calibration circuit comprises said load circuit formed from a plurality of load elements, the load elements comprising elements selectively controlled to one of an active state and an inactive state on the basis of stored contents of storage capacitances equal in number to the load elements.

8. A device according to claim 5 wherein the counter circuit has an initial value setting so that the sensor circuit output signal is set smaller than the calibration reference signal, and the stored contents when updated by the control signal make corrections to the sensor circuit output signal only in an increasing direction.

9. A device according to claim 5 wherein the comparison circuit includes a logic gate to perform an AND operation upon the voltage-time conversion signal and the calibration reference signal.

10. A device according to claim 5 wherein a value of the load element is a power of 2.

11. A device according to claim 5 wherein the counter circuit has a RAM-type latch circuit.

12. A device according to claim 1, wherein
  said sensor circuit comprises a signal amplification circuit for amplifying and outputting a signal level from said detection element, and
  said device further comprises a sensitivity adjustment circuit for adjusting a gain of said signal amplification circuit.

13. A device according to claim 1, wherein one of said detection elements, said sensor circuit connected to said detection element, and at least said calibration circuit of elements which construct said correction circuit connected to the output side of said sensor circuit to correct the output signal level, form one sensor cell, and wherein
  said sensor cells are two-dimensionally laid out, and
  each of said sensor cells comprises an offset circuit for adjusting a detection sensitivity of said sensor circuit.

14. A device according to claim 13, wherein said offset circuit is controlled by an offset control signal.

15. A device according to claim 13, wherein
  the offset control signal for controlling said offset circuit is common to said sensor cells, and
  said device further comprises a setting holding circuit for holding a set value of the offset control signal.

16. A device according to claim 13, wherein said offset circuit comprises a load circuit having at least one load element and a switch for selectively connecting the load element to said sensor circuit.

17. A device according to claim 13, wherein said offset circuit comprises a load circuit having a plurality of load elements, each of the load elements comprising an element selectively controlled to one of an active state and an inactive state.

18. A device according to claim 1, wherein one of said detection elements, said sensor circuit connected to said detection element, and at least said calibration circuit of elements which construct said correction circuit connected to the output side of said sensor circuit to correct the output signal level, form one sensor cell, and further comprising a test circuit arranged for each sensor circuit of said sensor cell to inspect said calibration circuit.

19. A device according to claim 18, wherein a test circuit control signal for controlling said test circuit is shared by said sensor cells.

20. A device according to claim 19, wherein said test circuit comprises a selector for outputting one of the signal from said sensor circuit and the signal from said calibration circuit as a sensor cell output.

21. A device according to claim 18, wherein said test circuit comprises a threshold circuit controlled by the signal from said calibration circuit to output the signal from said sensor circuit or fix the output level.

22. A device according to claim 21, wherein said calibration circuit incorporates a counter circuit and uses a most significant bit signal of said counter circuit as the signal of said test circuit.

23. A device according to claim 1, further comprises an inspection circuit for supplying an electric change amount for inspection to said sensor circuit.

24. A device according to claim 23, further comprises a switch for selectively connecting one of said detection element and inspection circuit to said sensor circuit.

25. A device according to claim 23, further comprising a switch for switching said inspection circuit (300) to one of an active state and an inactive state.

26. A device according to claim 23, wherein said inspection circuit comprises a dummy signal generation circuit for simulating and outputting an electric change amount from said detection element.

* * * * *